US012549754B2

(12) United States Patent
Okawa et al.

(10) Patent No.: US 12,549,754 B2
(45) Date of Patent: Feb. 10, 2026

(54) IMAGE ENCODING APPARATUS AND IMAGE DECODING APPARATUS FOR GENERATING A BITSTREAM TO DERIVE INFORMATION

(71) Applicant: CANON KABUSHIKI KAISHA, Tokyo (JP)

(72) Inventors: Koji Okawa, Tokyo (JP); Masato Shima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 181 days.

(21) Appl. No.: 17/556,480

(22) Filed: Dec. 20, 2021

(65) Prior Publication Data

US 2022/0116640 A1   Apr. 14, 2022

Related U.S. Application Data

(63) Continuation of application No. PCT/JP2020/021183, filed on May 28, 2020.

(30) Foreign Application Priority Data

Jun. 21, 2019 (JP) ................... 2019-115751

(51) Int. Cl.
    *H04N 19/463*     (2014.01)
    *H04N 19/119*     (2014.01)
    (Continued)

(52) U.S. Cl.
    CPC ......... *H04N 19/463* (2014.11); *H04N 19/119* (2014.11); *H04N 19/136* (2014.11);
    (Continued)

(58) Field of Classification Search
None
See application file for complete search history.

(56) References Cited

U.S. PATENT DOCUMENTS 9,294,776 B2   3/2016   Rapaka et al.
9,319,703 B2   4/2016   Wang
(Continued)

FOREIGN PATENT DOCUMENTS

CN    104170384 A    11/2014
CN    107483966 A    12/2017
(Continued)

OTHER PUBLICATIONS

Bross et al., "Versatile Video Coding (Draft 5)", Joint Video Experts Team (JVET) of ITU-T SG 16 WP 3 and ISO/IEC JTC 1/SC 29/ WG 11, 14th Meeting: Geneva, CH, Mar. 19-27, 2019, JVET-N1001-v7.*

(Continued)

*Primary Examiner* — Edemio Navas, Jr.
(74) *Attorney, Agent, or Firm* — Canon U.S.A., Inc. IP Division

(57) ABSTRACT

An image is divided into a plurality of tiles and the tile is divided into rectangular regions each including at least one block row formed from a plurality of blocks each having a size smaller than the tile. Based on information representing the number of rectangular regions included in a slice of the image, the rectangular region included in the slice is specified. Based on the number of blocks in a vertical direction in the specified rectangular region, the number of pieces of information for specifying a start position of coded data of the block row in the slice is specified. A bitstream in which at least the pieces of information whose number is specified, the information representing the number of rectangular regions included in the slice, and the coded data of the block row are multiplexed is generated.

14 Claims, 9 Drawing Sheets

(51) Int. Cl.
  *H04N 19/136* (2014.01)
  *H04N 19/174* (2014.01)
  *H04N 19/176* (2014.01)
  *H04N 19/436* (2014.01)
  *H04N 19/70* (2014.01)

(52) U.S. Cl.
  CPC ......... *H04N 19/174* (2014.11); *H04N 19/176* (2014.11); *H04N 19/436* (2014.11); *H04N 19/70* (2014.11)

(56) References Cited

U.S. PATENT DOCUMENTS

| | | | |
|---|---|---|---|
| 9,774,870 | B2 | 9/2017 | Sasai et al. |
| 9,969,299 | B2 | 5/2018 | Murase et al. |
| 9,998,764 | B2 | 6/2018 | Ye et al. |
| 10,313,698 | B2 | 6/2019 | Sullivan et al. |
| 10,911,754 | B2 | 2/2021 | Park et al. |
| 2013/0194384 | A1 | 8/2013 | Hannuksela |
| 2014/0254668 | A1 | 9/2014 | Rapaka et al. |
| 2014/0341549 | A1 | 11/2014 | Hattori |
| 2016/0142740 | A1* | 5/2016 | Sharman ............... H04N 19/96 375/240.12 |
| 2017/0324970 | A1 | 11/2017 | Okawa |
| 2019/0058885 | A1 | 2/2019 | Zhou |
| 2019/0075328 | A1 | 3/2019 | Huang et al. |
| 2020/0396474 | A1* | 12/2020 | Furht ............... H04N 19/184 |
| 2022/0030253 | A1 | 1/2022 | Wang |
| 2022/0248010 | A1 | 8/2022 | George et al. |
| 2023/0093994 | A1 | 3/2023 | Chen et al. |

FOREIGN PATENT DOCUMENTS

| | | |
|---|---|---|
| CN | 107517389 A | 12/2017 |
| JP | 2007166665 A | 6/2007 |
| JP | 2014011638 A | 1/2014 |
| JP | 2014011726 A | 1/2014 |
| JP | 2018088600 A | 6/2018 |
| WO | 2019009504 A1 | 1/2019 |
| WO | 2019/078169 A1 | 4/2019 |

OTHER PUBLICATIONS

Benjamin Bross, Versatile Video Coding (Draft 6), Joint Video Experts Team (JVET) of ITU-T SG16 WP3 and ISO/IEC JTC1/SC29/WG11, 15th Meeting, Gothenburg, SE, Jul. 3-12, 2019, Doc. No. JVET-O2001-v7.

Ye-Kui Wang, AHG12: Miscellaneous AHG12 topics, Joint Video Experts Team (JVET) of ITU-T SG16 WP3 and ISO/IEC JTC1/SC29/WG11, 15th Meeting, Gothenburg, SE, Jul. 3-12, 2019, Doc. No. JVET-O0145-v1.

Benjamin Bross, Versatile Video Coding (Draft 5), Joint Video Experts Team (JVET) of ITU-T SG16 WP3 and ISO/IEC JTC1/SC29/WG11, 14th Meeting, Geneva, CH, Mar. 19-27, 2019, Doc. No. JVET-N1001-v8.

Benjamin Bross, et al., Versatile Video Coding (Draft 5), Joint Video Experts Team (JVET) of ITU-T SG 16 WP 3 and ISO/IEC JTC 1/SC 29/WG 11, 14th Meeting, Geneva, CH, Mar. 19-27, 2019, pp. 18-97, Doc. No. , JVET-N1001-v7.

* cited by examiner

FIG. 7
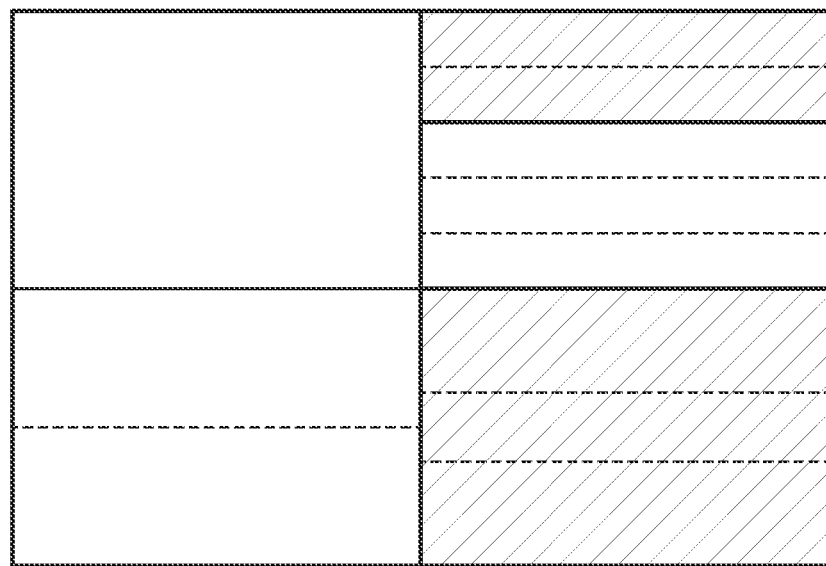
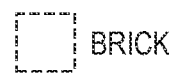 BRICK  TILE  SLICE

IMAGE ENCODING APPARATUS AND IMAGE DECODING APPARATUS FOR GENERATING A BITSTREAM TO DERIVE INFORMATION

CROSS-REFERENCE TO RELATED APPLICATIONS

This application is a Continuation of International Patent Application No. PCT/JP2020/021183, filed May 28, 2020, which claims the benefit of Japanese Patent Application No. 2019-115751, filed Jun. 21, 2019, both of which are hereby incorporated by reference herein in their entirety.

BACKGROUND OF THE INVENTION

Field of the Invention

The present invention relates to an encoding/decoding technique for an image.

Background Art

As an encoding method for compression recording of a moving image, an HEVC (High Efficiency Video Coding) encoding method (to be referred to as HEVC hereinafter) is known. In the HEVC, to improve the encoding efficiency, a basic block with a size larger than a conventional macroblock (16×16 pixels) is employed. The basic block of the large size is called a CTU (Coding Tree Unit), and its size is 64×64 pixels at maximum. The CTU is further divided into sub-blocks that are units to perform prediction or conversion.

Also, in the HEVC, a picture can be divided into a plurality of tiles or slices and encoded. The tiles or slices have little data dependence, and eneoding/decoding processing can be executed in parallel. One of great advantages of the tile or slice division is that processing can be executed in parallel by a multicore CPU or the like to shorten the processing time.

In addition, each slice is encoded by a conventional binary arithmetic encoding method employed in the HEVC. That is, each syntax element is binarized to generate a binary signal. To each syntax element, an occurrence probability is given in advance as a table (to be referred to as an occurrence probability table hereinafter), and each binary signal is arithmetically encoded based on the occurrence probability table. At the time of decoding, the occurrence probability table is used as decoding information for subsequent decoding of a code. At the time of encoding, the occurrence probability table is used as encoding information for subsequent encoding. Every time encoding is performed, the occurrence probability table is updated based on statistical information representing whether the encoded binary signal is a symbol of a higher occurrence probability.

Also, the HEVC uses a method for processing entropy encoding/decoding in parallel, which is called Wavefront Parallel Processing (to be referred to as WPP hereinafter). In the WPP, a table of occurrence probability obtained when a block at a position designated in advance is encoded is applied to the block at the left end of the next row, thereby enabling parallel encoding processing of blocks on a row basis while suppressing lowering of the encoding efficiency. To enable parallel processing on a block row basis, entry_point_offset_minus1 representing the start position of each block row in a bitstream and num_entry_point_offsets representing the number of entry_point_offset_minus1 are encoded in a slice header. PTL 1 discloses a technique associated with WPP.

In recent years, activities for international standardization of a more efficient encoding method that is the successor to the HEVC have been started. JVET (Joint Video Experts Team) has been established between ISO/IEC and ITU-T, and a VVC (Versatile Video Coding) encoding method (to be referred to as VVC hereinafter) has been standardized. In the VVC, it has been examined that a tile is further divided into rectangles (bricks) each formed from a plurality of block rows. In addition, each slice is configured to include one or more bricks.

In the VVC, bricks that form a slice can be derived in advance. In addition, the number of basic block rows included in each brick can be derived from another syntax. Hence, the number of entry_point_offset_minus1 representing the start positions of the basic block rows belonging to the slice can be derived without using num_entry_point_offset. For this reason, num_entry_point_offset is a redundant syntax.

CITATION LIST

Patent Literature

PTL 1: Japanese Patent Laid-Open No. 2014-11638

SUMMARY OF THE INVENTION

According to the first aspect of the present invention, there is provided an image encoding apparatus comprising: a division unit configured to divide an image into rectangular regions each including at least one block row formed from a plurality of blocks, and divide the image into rectangular slices or slices to be processed in raster order; a specifying unit configured to specify, based on information representing the number of rectangular regions included in a slice of the image, the rectangular region included in the slice, and specify, based on the number of blocks in a vertical direction in the specified rectangular region, the number of pieces of information for specifying a start position of coded data of the block row in the slice; and a generation unit configured to, in a case where the image is divided into the slices to be processed in raster order, generate a bitstream in which at least the pieces of information for specifying the start position, whose number is as many as the number specified by the specifying unit, the information representing the number of rectangular regions included in the slice, and the coded data of the block row are multiplexed.

According to the second aspect of the present invention, there is provided an image decoding apparatus configured to decode an image from a bitstream encoded by dividing an image into rectangular regions each including at least one block row formed from a plurality of blocks, and dividing the image into rectangular slices or slices to be processed in raster order, comprising: a decoding unit configured to, in a case where the image is divided into the slices to be processed in raster order, decode, from the bitstream, information representing the number of rectangular regions included in a slice of the image; and a specifying unit configured to specify, based on the information representing the number of rectangular regions included in the slice and the number of blocks in a vertical direction in the rectangular region, the number of pieces of information for specifying a start position of coded data of the block row in the slice, wherein the decoding unit decodes the coded data of the block row based on at least the number of pieces of information for specifying the start position, which is specified by the specifying unit, and the information for specifying the start position.

According to the third aspect of the present invention, there is provided an image encoding method, comprising: dividing an image into rectangular regions each including at least one block row formed from a plurality of blocks, and dividing the image into rectangular slices or slices to be processed in raster order; specifying based on information representing the number of rectangular regions included in a slice of the image, the rectangular region included in the slice, and specifying, based on the number of blocks in a vertical direction in the specified rectangular region, the number of pieces of information for specifying a start position of coded data of the block row in the slice; and in a case where the image is divided into the slices to be processed in raster order, generating a bitstream in which at least the pieces of information for specifying the start position, whose number is as many as the number specified in the specifying, the information representing the number of rectangular regions included in the slice, and the coded data of the block row are multiplexed.

According to the fourth aspect of the present invention, there is provided an image decoding method performed by an image decoding apparatus configured to decode an image from a bitstream encoded by dividing an image into rectangular regions each including at least one block row formed from a plurality of blocks, and dividing the image into rectangular slices or slices to be processed in raster order, comprising: in a case where the image is divided into the slices to be processed in raster order, decoding from the bitstream, information representing the number of rectangular regions included in a slice of the image; and specifying based on the information representing the number of rectangular regions included in the slice and the number of blocks in a vertical direction in the rectangular region, the number of pieces of information for specifying a start position of coded data of the block row in the slice, wherein in the decoding, the coded data of the block row is decoded based on at least the number of pieces of information for specifying the start position, which is specified in the specifying, and the information for specifying the start position.

According to the fifth aspect of the present invention, there is provided a non-transitory computer-readable storage medium for storing a computer program configured to cause a computer to execute: dividing an image into rectangular regions each including at least one block row formed from a plurality of blocks, and dividing the image into rectangular slices or slices to be processed in raster order; specifying based on information representing the number of rectangular regions included in a slice of the image, the rectangular region included in the slice, and specifying, based on the number of blocks in a vertical direction in the specified rectangular region, the number of pieces of information for specifying a start position of coded data of the block row in the slice; and in a case where the image is divided into the slices to be processed in raster order, generating a bitstream in which at least the pieces of information for specifying the start position, whose number is as many as the number specified in the specifying, the information representing the number of rectangular regions included in the slice, and the coded data of the block row are multiplexed.

According to the sixth aspect of the present invention, there is provided a non-transitory computer-readable storage medium for storing a computer program configured to cause a computer to execute an image decoding method performed by an image decoding apparatus configured to decode an image from a bitstream encoded by dividing an image into rectangular regions each including at least one block row formed from a plurality of blocks, and dividing the image into rectangular slices or slices to be processed in raster order, comprising: in a case where the image is divided into the slices to be processed in raster order, decoding from the bitstream, information representing the number of rectangular regions included in a slice of the image; and specifying based on the information representing the number of rectangular regions included in the slice and the number of blocks in a vertical direction in the rectangular region, the number of pieces of information for specifying a start position of coded data of the block row in the slice, wherein in the decoding, the coded data of the block row is decoded based on at least the number of pieces of information for specifying the start position, which is specified in the specifying, and the information for specifying the start position.

Further features of the present invention will become apparent from the following description of exemplary embodiments with reference to the attached drawings.

BRIEF DESCRIPTION OF THE DRAWINGS

FIG. 7 is a view showing a division example of an input image;

DESCRIPTION OF THE EMBODIMENTS

Figure 1:
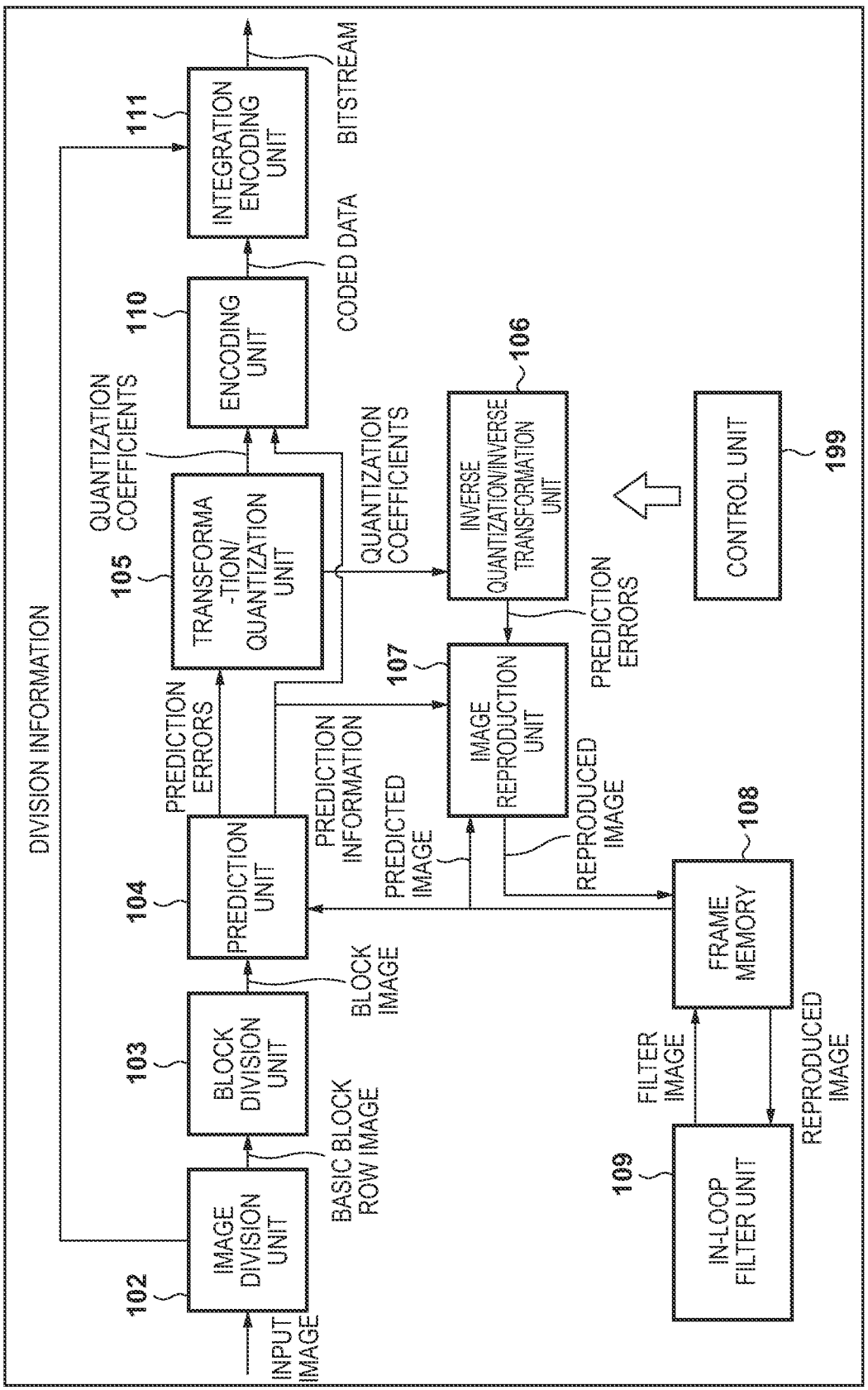
FIG. 1 is a block diagram showing an example of the functional configuration of an image encoding apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An example of the functional configuration of an image encoding apparatus according to this embodiment will be described first with reference to the block diagram of FIG. 1. An input image as an encoding target is input to an image division unit 102. The input image may be the image of each of frames that constitute a moving image, or may be a still image. The image division unit 102 divides the input image into "one or a plurality of tiles". A tile is a set of continuous basic blocks, which covers a rectangular region in the input image. The image division unit 102 further divides each tile into one or a plurality of bricks. A brick is a rectangular region (a rectangular region including at least one block row formed from a plurality of blocks each having a size smaller than that of a tile) formed by one or a plurality of rows of basic blocks (basic block rows) in a tile. The image division unit 102 also divides the input image into slices each formed from "one or a plurality of tiles" or "one or a plurality of bricks". The slice is the basic unit of encoding, and header information such as information representing a type of slice is added to each slice. FIG. 7 shows an example in which an input image is divided into four tiles, four slices, and 11 bricks. The upper left tile is divided into one brick, the lower left tile is divided into two bricks, the upper right tile is divided into five bricks, and the lower right tile is divided into three bricks. The left slice is configured to include three bricks, the upper right slice is configured to include two bricks, the right center slice is configured to include three bricks, and the lower right slice is configured to include three bricks. For each of the thus divided tiles, bricks, and slices, the image division unit 102 outputs, as division information, information concerning the size.

A block division unit 103 divides the image of a basic block row (basic block row image) output from the image division unit 102 into a plurality of basic blocks, and outputs the image of each basic block (block image) to the subsequent stage.

A prediction unit 101 divides the image of each basic block into sub-blocks and performs, for each sub-block, intra-prediction that is intra-frame prediction or inter-prediction that is inter-frame prediction, thereby generating a predicted image. Intra-prediction across a brick (intra-prediction using the pixels of the blocks of another brick) or motion vector prediction across a brick (motion vector prediction using the motion vectors of the blocks of another brick) is not performed. Also, the prediction unit 104 calculates prediction errors from the input image and the predicted image and outputs the prediction errors. In addition, the prediction unit 104 outputs information (prediction information) necessary for prediction, for example, pieces of information such as a sub-block division method, a prediction mode, and a motion vector together with the prediction errors.

A transformation/quantization unit 105 orthogonally transforms the prediction errors on a sub-block basis to obtain transformation coefficients, and quantizes the obtained transformation coefficients to obtain quantization coefficients. An inverse quantization/inverse transformation unit 106 inversely quantizes the quantization coefficients output from the transformation/quantization unit 105 to reproduce the transformation coefficient, and also inversely orthogonally transforms the reproduced transformation coefficients to reproduce the prediction errors.

A frame memory 108 functions as a memory that stores a reproduced image. An image reproduction unit 107 generates a predicted image by appropriately referring to the frame memory 108 based on the prediction information output from the prediction unit 104, generates a reproduced image from the predicted image and the input prediction errors, and outputs the reproduced image.

An in-loop filter unit 109 performs in-loop filter processing such as deblocking filter processing or sample adaptive offset for the reproduced image, and outputs the image (filter image) that has undergone the in-loop filter processing.

An encoding unit 110 generates coded data (encoded data) by encoding the quantization coefficients output from the transformation/quantization unit 105 and the prediction information output from the prediction unit 104, and outputs the generated coded data.

An integration encoding unit 111 generates header coded data using the division information output from the image division unit 102, generates a bitstream including the generated header coded data and the coded data output from the encoding unit 110, and outputs the bitstream. A control unit 199 controls the operation of the entire image encoding apparatus, and controls the operations of the above-described functional units of the image encoding apparatus.

Encoding processing for an input image by the image encoding apparatus having the configuration shown in FIG. 1 will be described next. In this embodiment, to facilitate the description, only processing of intra-prediction coding will be described. However, the embodiment is not limited to this, and can also be applied to processing of inter-prediction coding. Also, in this embodiment, for the sake of detailed description, the description will be made assuming that the block division unit 103 divides a basic block row image output from the image division unit 102 into "basic blocks each having a size of 64×64 pixels".

Figure 8A:
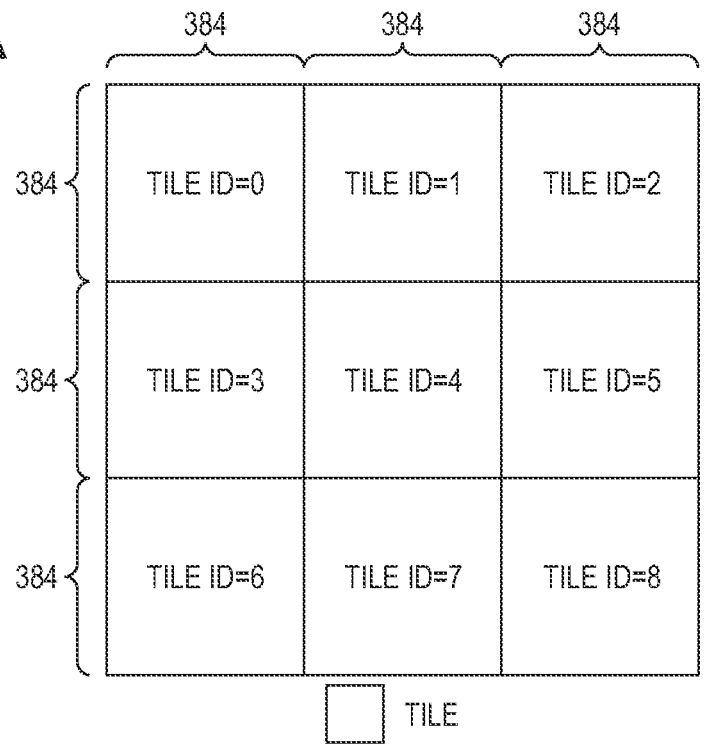
FIG. 8A is a view showing an example of division of an input image.
Figure 8B:
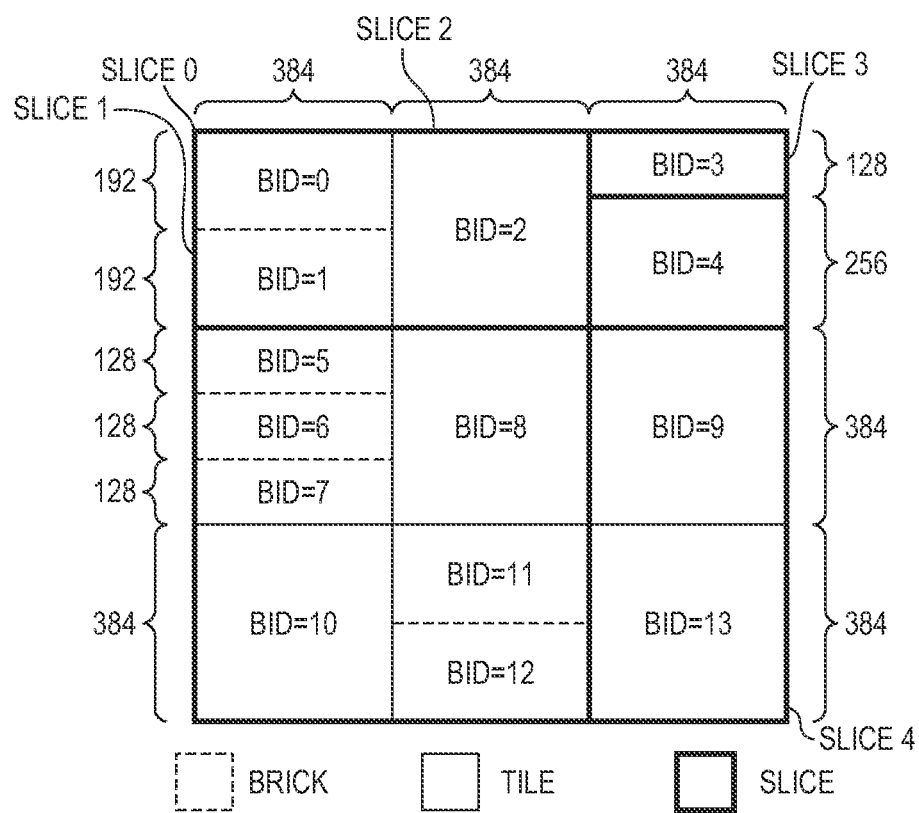
FIG. 8B is a view showing an example of division of an input image.

The image division unit 102 divides an input image into tiles, bricks, and slices. FIGS. 8A and 8B show an example of division of an input image by the image division unit 102. In this embodiment, as shown in FIG. 8A, an input image having a size of 1152×1152 pixels is divided into nine tiles (the size of one tile is 384×384 pixels). Each tile is given an ID (tile ID) in the raster order from the upper left corner. The tile ID of the upper left tile is 0, and the tile ID of the lower right tile is 8.

FIG. 8B shows an example of division of tiles, bricks, and slices in the input image. As shown in FIG. 8B, each of the tile of tile ID=0 and the tile of tile ID=7 is divided into two bricks (the size of each brick is 384×192 pixels). The tile of tile ID=2 is divided into two bricks (the size of the brick on the upper side is 384×128 pixels, and the size of the brick on the lower side is 384×256 pixels). The tile of tile ID=3 is divided into three bricks (the size of each brick is 384×128 pixels). The tiles of tile ID=1, 4, 5, 6, and 8 are not divided into bricks (equivalent to dividing one tile into one brick), and as a result, tile=brick. Each brick is given an ID sequentially from the upper side in the tiles of raster order. BID shown in FIG. 8B is the ID of a brick. Also, the input image is divided into slices 0 to 4. Slice 0 is a slice including a brick corresponding to BID=0, slice 1 is a slice including a brick corresponding to BID=1, and slice 2 is a slice including a brick corresponding to BID=2. Slice 3 is a slice including bricks corresponding to BID=3 to 10, and slice 4 is a slice including bricks corresponding to BID=11 to 13. Note that each slice is also given an ID sequentially from the upper side in the slices of raster order. For example, slice 0 indicates the slice of ID=0, and slice 4 indicates the slice of ID=4.

For each of the divided tiles, bricks, and slices, the image division unit 102 outputs information concerning the size as division information to the integration encoding unit 111. In addition, the image division unit 102 divides each brick into basic block row images and outputs the divided basic block row images to the block division unit 103.

The block division unit 103 divides each of the basic block row images output from the image division unit 102 into a plurality of basic blocks, and outputs a block image (64×64 pixels) that is an image of each basic block to the prediction unit 104 of the subsequent stage.

The prediction unit 104 divides the image of each basic block into sub-blocks, decides an intra-prediction mode such as horizontal prediction or vertical prediction on a sub-block basis, and generates a predicted image based on the decided intra-prediction mode and encoded pixels. Furthermore, the prediction unit 104 calculates prediction errors from the input image and the predicted image, and outputs the calculated prediction errors to the transformation/quantization unit 105. In addition, the prediction unit 104 outputs pieces of information such as a sub-block division method and an intra-prediction mode as prediction information to the encoding unit 110 and the image reproduction unit 107.

The transformation/quantization unit 105 performs, on a sub-block basis, orthogonal transformation (orthogonal transformation processing corresponding to the size of a sub-block) for the prediction errors output from the prediction unit 104, thereby obtaining transformation coefficients (orthogonal transformation coefficients). The transformation/quantization unit 105 quantizes the obtained transformation coefficients, thereby obtaining quantization coefficients. The transformation/quantization unit 105 outputs the obtained quantization coefficients to the encoding unit 110 and the inverse quantization/inverse transformation unit 106.

The inverse quantization/inverse transformation unit 106 inversely quantizes the quantization coefficients output from the transformation/quantization unit 105 to reproduce the transformation coefficients, and further inversely orthogonally transforms the reproduced transformation coefficients to reproduce the prediction errors. The inverse quantization/inverse transformation unit 106 then outputs the reproduced prediction errors to the image reproduction unit 107.

The image reproduction unit 107 generates a predicted image by appropriately referring to the frame memory 108 based on the prediction information output from the prediction unit 104, and generates a reproduced image from the predicted image and the prediction errors input from the inverse quantization/inverse transformation unit 106. The image reproduction unit 107 then stores the generated reproduced image in the frame memory 108.

The in-loop filter unit 109 reads out the reproduced image from the frame memory 108, and performs in-loop filter processing such as deblocking filter processing or sample adaptive offset for the readout reproduced image. The in-loop filter unit 109 then stores (restores) the image that has undergone the in-loop filter processing in the frame memory 108.

The encoding unit 110 entropy-encodes the quantization coefficients output from the transformation/quantization unit 105 and the prediction information output from the prediction unit 104, thereby generating coded data. The method of entropy encoding is not particularly designated, and Golomb coding, arithmetic encoding, Huffman coding, or the like can be used. The encoding unit 110 then outputs the generated coded data to the integration encoding unit 111.

The integration encoding unit 111 generates header coded data using the division information output from the image division unit 102, generates a bitstream by multiplexing the generated header coded data and the coded data output from the encoding unit 110, and outputs the bitstream. The output destination of the bitstream is not limited to a specific output destination. The bitstream may be output to (stored in) a memory inside or outside the image encoding apparatus, or may be transmitted to an external apparatus capable of communicating with the image encoding apparatus via a network such as a LAN or the Internet.

Figure 6:
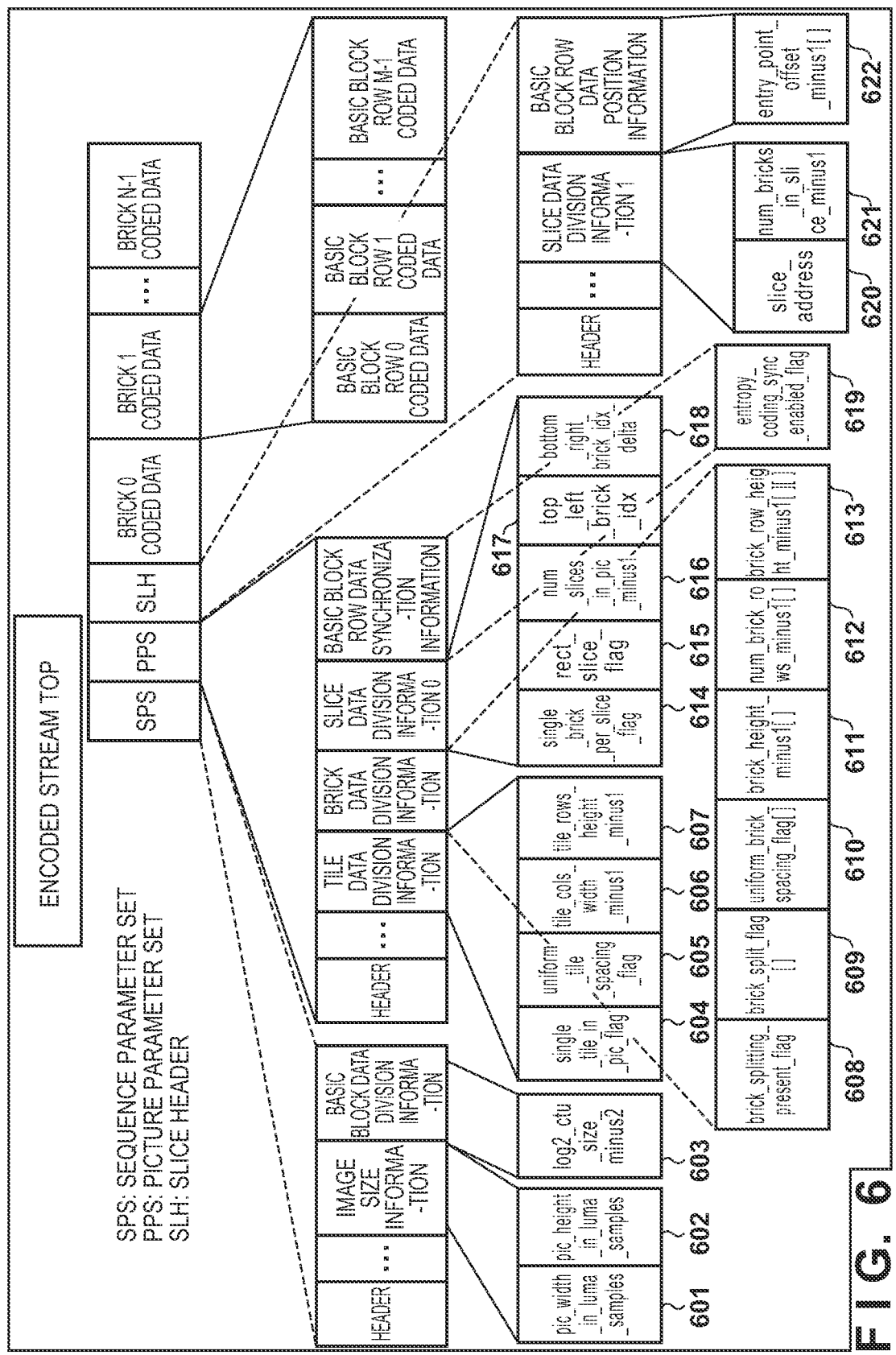
FIG. 6 is a view showing an example of the format of a bitstream.

Next, FIG. 6 shows an example of the format of a bitstream (coded data by VVC, which is encoded by the image encoding apparatus) output from the integration encoding unit 111. The bitstream shown in FIG. 6 includes a sequence parameter set (SPS) that is header information including information concerning encoding of a sequence. Also, the bitstream shown in FIG. 6 includes a picture parameter set (PPS) that is header information including information concerning encoding of a picture. In addition, the bitstream shown in FIG. 6 includes a slice header (SLH) that is header information including information concerning encoding of a slice. Furthermore, the bitstream shown in FIG. 6 includes coded data of bricks (brick 0 to brick (N−1) in FIG. 6).

The SPS includes image size information and basic block data division information. The PPS includes tile data division information that is the division information of tiles, brick data division information that is the division information of bricks, slice data division information 0 that is the division information of slices, and basic block row data synchronization information. The SLH includes slice data division information 1 and basic block row data position information.

The SPS will be described first. The SPS includes, as image size information, pic_width_in_luma_samples that is information 601 and pic_height_in_luma_samples that is information 602. pic_width_in_luma_samples represents the size (number of pixels) of an input image in the horizontal direction, and pic_height_in_luma_samples represents the size (number of pixels) of the input image in the vertical direction. In this embodiment, since the input image shown in FIGS. 8A and 8B is used as the input image, pic_width_in_luma_samples=1152, and pic_height_in_luma_samples=1152. The SPS also includes, as basic block data division information, log2_ctu_size_minus2 that is information 603. log2_ctu_size_minus2 represents the size of a basic block. The number of pixels of the basic block in the horizontal direction and the vertical direction is expressed by 1<<(log2_ctu_size_minus2+2). In this embodiment, since the size of a basic block is 64×64 pixels, the value of log2_ctu_size_minus2 is 4.

Next, the PPS will be described. The PPS includes pieces of information 604 to 607 as tile data division information. The information 604 is single_tile_in_pic_flag representing whether the input image is divided into a plurality of tiles and encoded. If single_tile_in_pic_flag=1, this indicates that the input image is not divided into a plurality of tiles and encoded. On the other hand, if single_tile_in_pic_flag=0, this indicates that the input image is divided into a plurality of tiles and encoded.

The information 605 is information included in the tile data division information when single_tile_in_pic_flag=0. The information 605 is uniform_tile_spacing_flag representing whether each tile has the same size. If uniform_tile_spacing_flag=1, this indicates that each tile has the same size. If uniform_tile_spacing_flag=0, this indicates that a tile that does not have the same size exists.

The information 606 and the information 607 are pieces of information included in the tile data division information when uniform_tile_spacing_flag=1. The information 606 is tile_cols_width_minus1 representing (the number of horizontal basic blocks of a tile−1). The information 607 is tile_rows_height_minus1 representing (the number of vertical basic blocks of a tile−1). The number of horizontal tiles of the input image is obtained as a quotient in a case in which the number of horizontal basic blocks of the input image is divided by the number of horizontal basic blocks of a tile. If a remainder is generated by this division, a number obtained by adding 1 to the quotient is defined as "the number of horizontal tiles of the input image". In addition, the number of vertical tiles of the input image is obtained as a quotient in a case in which the number of vertical basic blocks of the input image is divided by the number of vertical basic blocks of a tile. If a remainder is generated by this division, a number obtained by adding 1 to the quotient is defined as "the number of vertical tiles of the input image". Also, the total number of tiles in the input image can be obtained by calculating the number of horizontal tiles of the input image×the number of vertical tiles of the input image.

Note that since a tile whose size is different from others is included if uniform_tile_spacing_flag=0, the number of horizontal tiles of the input image, the number of vertical tiles of the input image, and the vertical and horizontal sizes of each tile are converted into codes.

The PPS also includes pieces of information 608 to 613 as brick data division information. The information 608 is brick_splitting_present_flag. If brick_splitting_present_flag=1, this indicates that one or more tiles in the input image are divided into a plurality of bricks. On the other hand, if brick_splitting_present_flag=0, this indicates that each tile in the input image is formed by a single brick.

The information 609 is information included in the brick data division information when brick_splitting_present_flag=1. The information 609 is brick_split_flag[ ] representing, for each tile, whether the tile is divided into a plurality of bricks, brick_split_flag[ ] representing whether the ith tile is divided into a plurality of bricks is expressed as brick_split_flag[i]. If brick_split_flag[i]=1, this indicates that the ith tile is divided into a plurality of bricks. If brick_split_flag[i]=0, this indicates that the ith tile is formed by a single brick.

The information 610 is uniform_brick_spacing_flag[i] representing whether, if brick_split_flag[i]=1, the bricks that form the ith tile have the same size. If brick_split_flag[i]=0 for all i, the information 610 is not included in the brick data division information. For i that satisfies brick_split_flag[i]=1, the information 610 includes uniform_brick_spacing_flag[i]. If uniform_brick_spacing_flag[i]=1, this indicates that the bricks that form the ith tile have the same size. On the other hand, if uniform_brick_spacing_flag[i]=0, this indicates that a brick whose size is different from others exists among the bricks that form the ith tile.

The information 611 is information included in the brick data division information when uniform_brick_spacing_flag[i]=1. The information 611 is brick_height_minus1[i] representing (the number of vertical basic blocks of a brick in the ith tile−1).

Note that the number of vertical basic blocks of a brick can be obtained by dividing the number of vertical pixels of the brick by the number of vertical pixels of a basic block (64 pixels in this embodiment). Also, the number of bricks that form a tile is obtained as a quotient in a case in which the number of vertical basic blocks of the tile is divided by the number of vertical basic blocks of a brick. If a remainder is generated by this division, a number obtained by adding 1 to the quotient is defined as "the number of bricks that form the tile". For example, assume that the number of vertical basic blocks of a tile is 10, and the value of brick_height_minus1 is 2. At this time, the tile is divided into four bricks including, sequentially from the upper side, a brick in which the number of basic block rows is 3, a brick in which the number of basic block rows is 3, a brick in which the number of basic block rows is 3, a brick in which the number of basic block rows is 1.

The information 612 is num_brick_rows_minus1[i] representing (the number of bricks that form the ith tile−1) for i that satisfies uniform_brick_spacing_flag[i]=0.

Note that in this embodiment, if uniform_brick_spacing_flag[i]=0, num_brick_rows_minus1[i] representing (the number of bricks that form the ith tile−1) is included in the brick data division information. However, the present invention is not limited to this.

For example, assume that the number of bricks that form the ith tile is 2 or more when brick_split_flag[i]=1. Then, num_brick_rows_minus2[i] representing (the number of bricks that form the tile−2) may be encoded in place of num_brick_rows_minus1[i]. This can decrease the number of bits of a syntax representing the number of bricks that form the tile. For example, if the tile is formed by two bricks, and num_brick_rows_minus1[i] is Golomb-coded, 3-bit data "010" indicating "1" is encoded. On the other hand, if num_brick_rows_minus2[i] representing (the number of bricks that form the tile−2) is Golomb-coded, 1-bit data "0" indicating 0 is encoded.

The information 613 is brick_row_height_minus1[i][j] representing (the number of vertical basic blocks of the ith brick in the ith tile−1) for i that satisfies uniform_brick_spacing_flag[i]=0. brick_row_height_minus1[i][j] is encoded as many as the number of num_brick_rows_minus1[i]. Note that if num_brick_rows_minus2[i] described above is used, brick_row_height_minus1[i][j] is encoded as many as the number of num_brick_rows_minus2[i]+1. The number of vertical basic blocks of a brick at the lower end of a tile can be obtained by subtracting the total sum of "brick_row_height_minus1+1" from the number of vertical basic blocks of the tile. For example, assume that the number of vertical basic blocks of the tile=10, num_brick_rows_minus1=3, and brick_row_height_minus1=2, 1, 2. At this time, the number of vertical basic blocks of a brick at the lower end of the tile is 10−(3+2+3)=2.

In addition, the PPS includes pieces of information 614 to 618 as slice data division information 0. The information 614 is single_brick_per_slice_flag. If single_brick_per_slice_flag=1, this indicates that all slices in the input image are formed by single bricks. That is, it is indicated that each slice is formed by only one brick. On the other hand, if single_brick_per_slice_flag=0, this indicates that one or more slices in the input image are formed by a plurality of bricks.

Figure 9A:
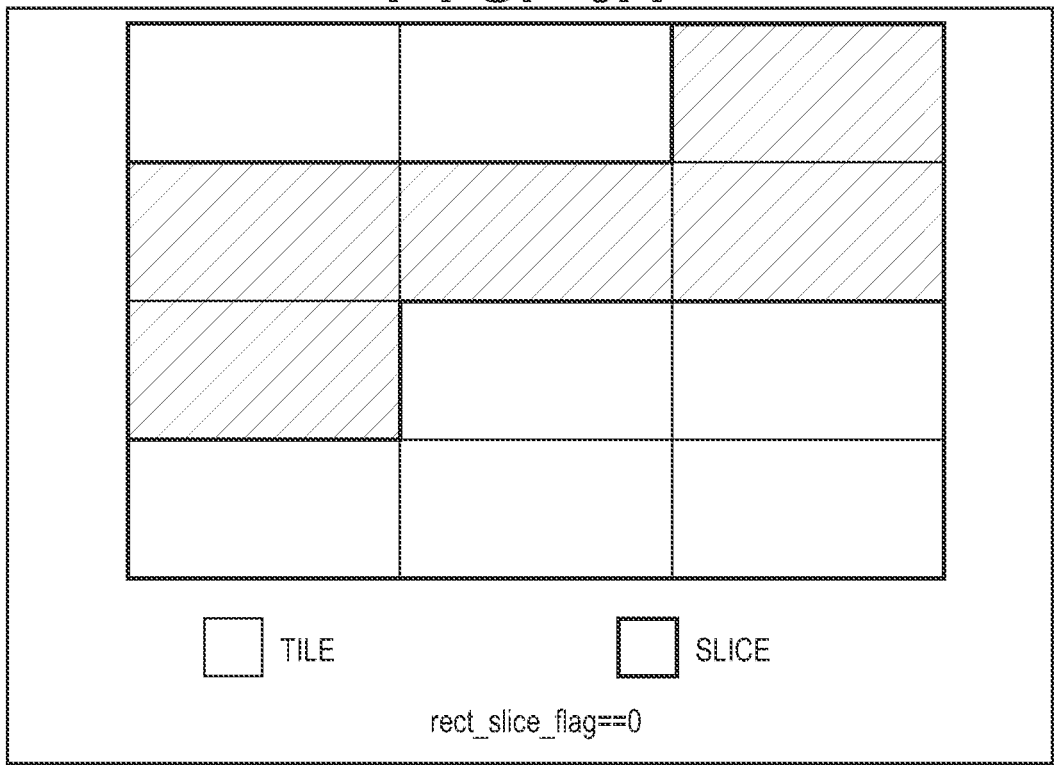
FIG. 9A is a view showing the relationship between tiles and slices.
Figure 9B:
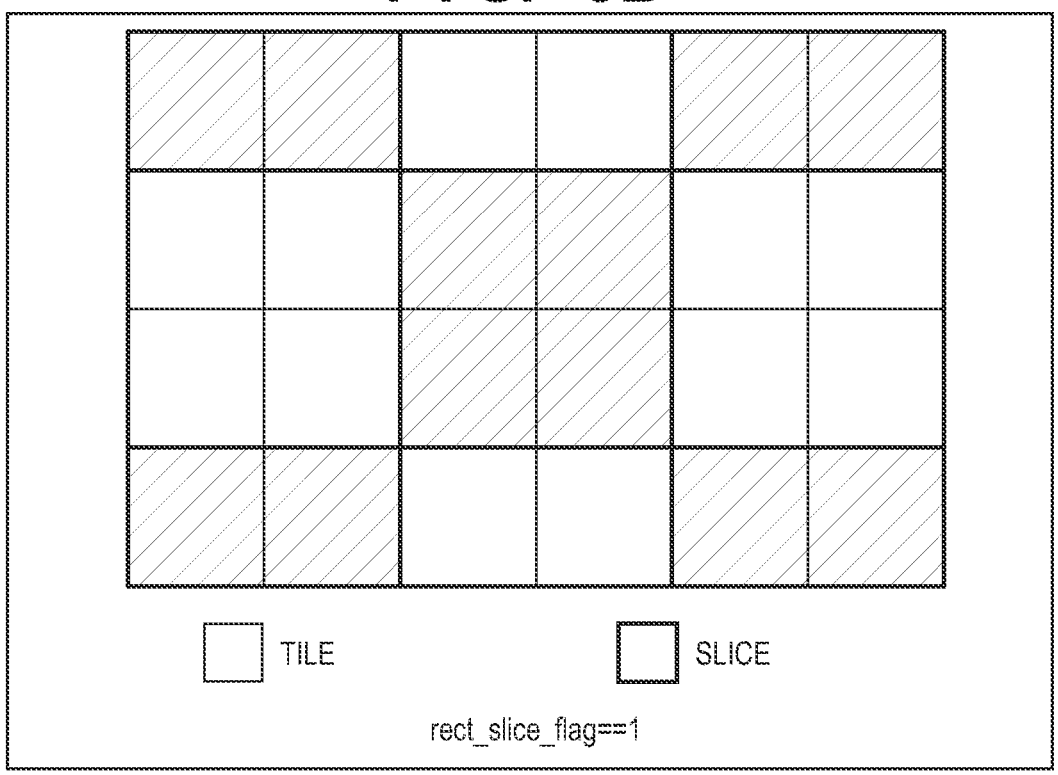
FIG. 9B is a view showing the relationship between tiles and slices.

The information 615 is rect_slice_flag, and is information included in slice data division information 0 when single_brick_per_slice_flag=0. rect_slice_flag represents whether tiles included in a slice have a rectangular shape or are arranged in the raster order. FIG. 9A shows the relationship between tiles and slices when rect_slice_flag=0, and shows that tiles in a slice are encoded in the raster order. On the other hand, FIG. 9B shows the relationship between tiles and slices when rect_slice_flag=1, and shows that a plurality of tiles in each slice are rectangular.

The information 616 is num_slices_in_pic_minus1 and is information included in the slice data division information 0 when rect_slice_flag=1, and single_brick_per_slice_flag=0. num_slices_in_pic_minus1 represents (the number of slices in the input image−1).

The information 617 is top_left_brick_idx[i] representing, for each slice in the input image, the index of the upper left brick of the slice (ith slice).

The information 618 is bottom_right_brick_idx_delta[i] representing the difference between the index of the upper left brick of the ith slice in the input image and the index of the lower right brick. Here, "the upper left brick of the ith slice in the input image" is the brick to be processed first in the slice. Also, "the lower right brick of the ith slice in the input image" is the brick to be processed last in the slice. However, since the index of the upper left brick of the first slice in a frame is always 0, top_left_brick_idx[0] of the first slice is not encoded.

In addition, information 619 is encoded and included in the PPS as basic block row data synchronization information. The information 619 is entropy_coding_sync_enabled_flag. If entropy_coding_sync_enabled_flag=1, a table of occurrence probability obtained when a basic block at a predetermined position of the basic block row adjacent on the upper side is processed is applied to the block at the left end. This makes it possible to perform parallel processing of entropy encoding/decoding on a basic block row basis.

The SLH will be described next. Pieces of information 620 and 621 are encoded and included in the SLH as slice data division information 1. The information 620 is slice_address included in the slice data division information 1 when rect_slice_flag=1 or the number of bricks in the input image is 2 or more. If rect_slice_flag=0, slice_address indicates the BID at the top of a slice. If rect_slice_flag=1, slice_address indicates the number of a current slice.

The information 621 is num_bricks_in_slice_minus1 included in the slice data division information 1 when rect_slice_flag=0 and single_brick_per_slice_flag=0. num_bricks_in_slice_minus1 represents (the number of bricks in the slice−1).

The SLH includes information 622 as basic block row data position information. The information 622 is entry_point_offset_minus1[ ]. If entropy_coding_sync_enabled_flag=1, entry_point_offset_minus1[ ] is encoded and included as many as the number of (the number of basic block rows in a slice−1) in the basic block row data position information.

entry_point_offset_minus1[ ] represents the entry point of the coded data of a basic block row, that is, the start position of the coded data of a basic block row. entry_point_offset_minus1[j−1] represents the entry point of the coded data of the jth basic block row. The start position of the coded data of the 0th basic block row is the same as the start position of the coded data of the slice to which the basic block row belongs, and is therefore omitted. {The size of the coded data of the (j−1)th basic block row−1} is encoded as entry_point_offset_minus1[j−1].

Figure 3:
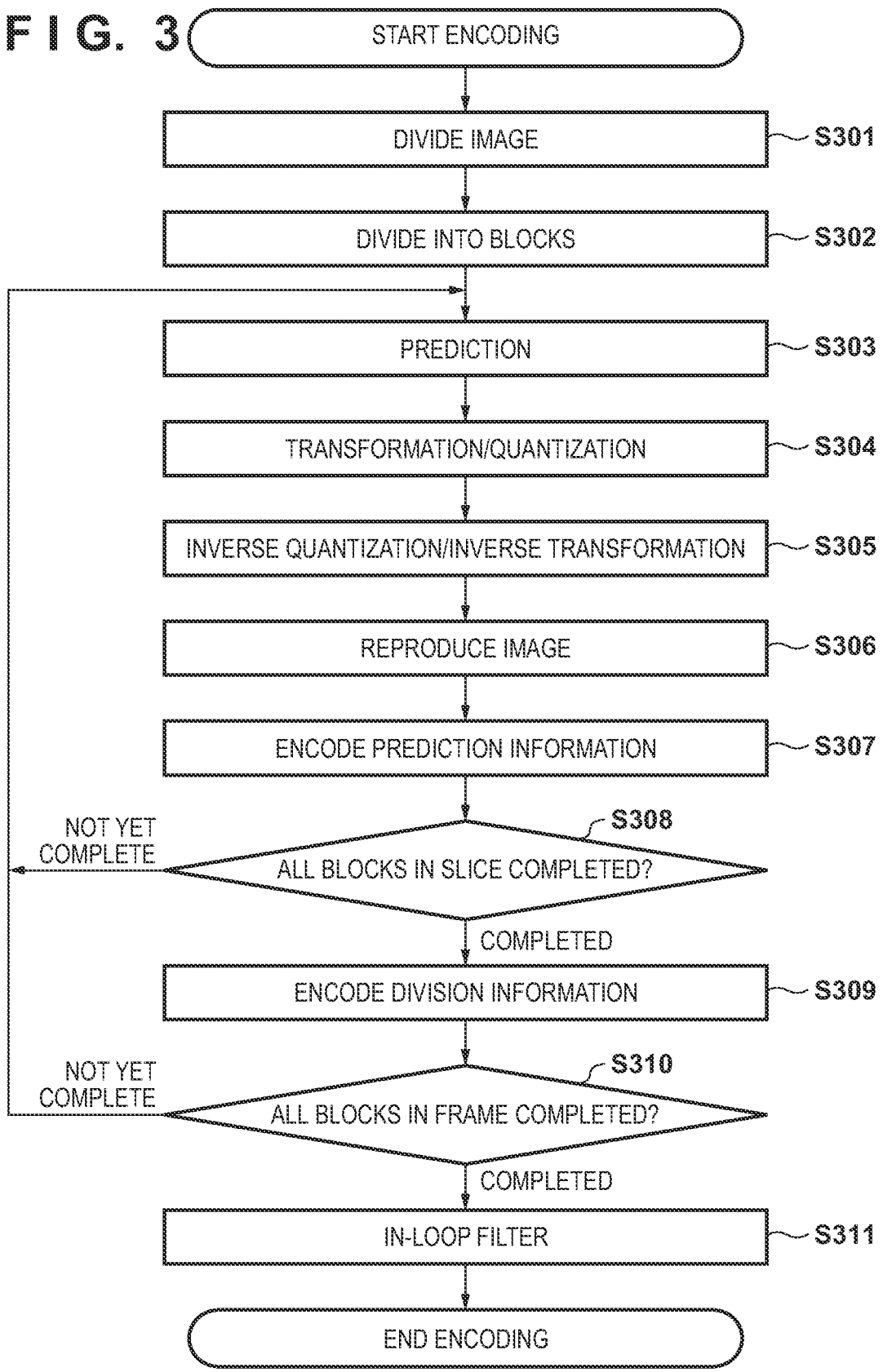
FIG. 3 is a flowchart of encoding processing of an input image by the image encoding apparatus.

Encoding processing of an input image (generation processing of a bitstream having the configuration shown in FIG. 6) by the image encoding apparatus according to this embodiment will be described next with reference to the flowchart of FIG. 3.

First, in step S301, the image division unit 102 divides an input image into tiles, bricks, and slices. For each of the divided tiles, bricks, and slices, the image division unit 102 then outputs information concerning the size to the integration encoding unit 111 as division information. In addition, the image division unit 102 divides each brick into basic block row images, and outputs the divided basic block row images to the block division unit 103.

In step S302, the block division unit 103 divides each basic block row image into a plurality of basic blocks, and outputs a block image that is the image of each basic block to the prediction unit 104 of the subsequent stage.

In step S303, the prediction unit 104 divides the image of each basic block output from the block division unit 103 into sub-blocks, decides an intra-prediction mode on a sub-block basis, and generates a predicted image based on the decided intra-prediction mode and encoded pixels. Also, the prediction unit 104 calculates prediction errors based on the input image and the predicted image, and outputs the calculated prediction errors to the transformation/quantization unit 105, in addition, the prediction unit 104 outputs pieces of information such as a sub-block division method and an intra-prediction mode to the encoding unit 110 and the image reproduction unit 107 as prediction information.

In step S304, the transformation/quantization unit 105 orthogonally transforms the prediction errors output from the prediction unit 104 on a sub-block basis, thereby obtaining transformation coefficients (orthogonal transformation coefficients). The transformation/quantization unit 105 then quantizes the obtained transformation coefficients, thereby obtaining quantization coefficients. The transformation/quantization unit 105 outputs the obtained quantization coefficients to the encoding unit 110 and the inverse quantization/inverse transformation unit 106.

In step S305, the inverse quantization/inverse transformation unit 106 inversely quantizes the quantization coefficients output from the transformation/quantization unit 105 to reproduce the transformation coefficients, and further inversely orthogonally transforms the reproduced transformation coefficients, thereby reproducing the prediction errors. The inverse quantization/inverse transformation unit 106 then outputs the reproduced prediction errors to the image reproduction unit 107.

In step S306, the image reproduction unit 107 generates a predicted image by appropriately referring to the frame memory 108 based on the prediction information output from the prediction unit 104, and generates a reproduced image from the predicted image and the prediction errors input from the inverse quantization/inverse transformation unit 106. The image reproduction unit 107 then stores the generated reproduced image in the frame memory 108.

In step S307, the encoding unit 110 generates coded data by entropy-encoding the quantization coefficients output from the transformation/quantization unit 105 and the prediction information output from the prediction unit 104.

Here, if entropy_coding_sync_enabled_flag=1, an occurrence probability table obtained when a basic block at a predetermined position of the basic block row adjacent on the upper side is processed is applied before the basic block at the left end of the next basic block row is processed. In this embodiment, a description will be made assuming that entropy_coding_sync_enabled_flag=1.

In step S308, the control unit 199 determines whether encoding of all basic blocks in a slice is completed. As the result of this determination, if encoding of all basic blocks in a slice is completed, the process advances to step S309. On the other hand, if a basic block that has not been encoded yet (unencoded basic block) remains among the basic blocks in the slice, the process returns to step S303 to encode the unencoded basic block.

In step S309, the integration encoding unit 111 generates header coded data using the division information output from the image division unit 102, generates a bitstream including the generated header coded data and the coded data output from the encoding unit 110, and outputs the bitstream.

If the input image is divided as shown in FIGS. 8A and 8B, single_tile_in_pic_flag of tile data division information is 0, and uniform_tile_spacing_flag is 1. In addition, tile_cols_width_minus1 is 5, and tile_rows_height_minus1 is 5.

brick_splitting_present_flag of brick data division information is 1. Tiles corresponding to tile ID=1, 4, 5, 6, and 8 are not divided into bricks. Hence, brick_split_flag[1], brick_split_flag[4], brick_split_flag[5], brick_split_flag[6], and brick_split_flag[8] are 0. Tiles corresponding to tile ID=0, 2, 3, and 7 are divided into bricks. Hence, brick_split_flag[0], brick_split_flag[2], brick_split_flag[3], and brick_split_flag[7] are 1.

Also, each of the tiles corresponding to tile ID=0, 3, and 7 is divided into bricks of the same size. Hence, uniform_brick_spacing_flag[0], uniform_brick_spacing_flag[3], and uniform_brick_spacing_flag[7] are 1. As for the tile corresponding to tile=2, the size of the brick of BID=3 is different from the size of the brick of BID=4. Hence, uniform_brick_spacing_flag[2] is 0.

brick_height_minus1[0] is 2, and brick_height_minus1[3] is 1. Also, brick_height_minus1[7] is 2. Note that brick_height_minus1 is encoded. when uniform_brick_spacing is 1.

brick_row_height_minus1[2][0] is 1. Note that when not num_brick_rows_minus1[2] but the syntax of num_brick_rows_minus2[2] described above is encoded instead, the value is 0.

Also, in this embodiment, since one slice includes a plurality of bricks, single_brick_per_slice_flag in slice data division information 0 is 0. Additionally, in this embodiment, since a slice includes a plurality of tiles in the raster order (a slice includes tiles arranged in the raster order), rect_slice_flag is 0.

In this case, as the slice data division information in the SLH, first, the first BID in the slice (the smallest BID in the BIDs of the bricks in the slice) is encoded as slice_address.

For slice 0, "0" that is the BID of the first brick in slice 0 is encoded as slice_address. For slice 1, "1" that is the BID of the first brick in slice 1 is encoded as slice address. For slice 2, "2" that is the BID of the first brick in slice 2 is encoded as slice_address. For slice 3, "3" that is the BID of the first brick in slice 3 is encoded as slice_address. For slice 4, "11" that is the BID of the first brick in slice 4 is encoded as slice_address.

Then, how many bricks are included in each slice is encoded as num_bricks_in_slice_minus1. Since the brick included in slice 0 is only the brick corresponding to BID=0 (only the single brick), num_bricks_in_slice_minus1 corresponding to slice 0 is 0. Since the brick included in slice 1 is only the brick corresponding to BID=1 (only the single brick), num_bricks_in_slice_minus1 corresponding to slice 1 is 0. Since the brick included in slice 2 is only the brick corresponding to BID=2 (only the single brick), num_bricks_in_slice_minus1 corresponding to slice 2 is 0. Since the bricks included in slice 3 are the bricks corresponding to BID=3 to 10 (eight bricks), num_bricks_in_slice_minus1 corresponding to slice 3 is 7. Since the bricks included in slice 4 are the bricks corresponding to BID=11 to 13 (three bricks), num_bricks_in_slice_minus1 corresponding to slice 4 is 2.

Next, in the basic block row data position information, the value of (the size of the coded data of the (j−1)th basic block row in the slice−1) sent from the encoding unit 110 is encoded as entry_point_offset_minus1[j−1]. The number of entry_point_offset_minus1 in the slice equals (the number of basic block rows in the slice−1).

Slice 0 is formed by a single brick (corresponding num_slice_in_minus1=0), and brick_height_minus1[0]=2. Hence, the number of basic block rows of the brick is brick_height_minus1[0]+1=3 (j ranges from 0 to 1).

Slice 1 is formed by a single brick (corresponding num_bricks_in_slice_minus1=0), and brick_height_minus1[0]=2, and tile_rows_height_minus1=5. Hence, the number of basic block rows of the brick is tile_rows_height_minus1−brick_height_minus1[0]=3 (j ranges from 0 to 1).

Slice 2 is formed by a single brick (corresponding num_bricks_in_slice_minus1=0), and brick_height_minus1[1]=5. Hence, the number of basic block rows of the brick is brick_height_minus1[1]+1=6 (j ranges from 0 to 4).

In slice 3, corresponding slice_address=3, and corresponding num_bricks_in_slice_minus1=7. Hence, slice 3 is formed by bricks (eight bricks) corresponding to BID=3 to 10 (=slice_address+num_bricks_in_slice_minus1). The number of basic block rows in slice 3 is the sum of the numbers of basic block rows of the bricks corresponding to BID=3 to 10.

Since brick_row_height_minus2[2][0]=1, the number of basic block roles of the brick corresponding to BID=3 is brick_row_height_minus1[2][0]+1=2.

The number of basic block rows of the brick corresponding to BID=4 can be derived in the following way. brick_row_height_minus1[2][0]=1, num_brick_rows_minus1[2]=1, and tile_rows_height_minus1=5. Hence, the number of basic block rows of the brick corresponding to BID=4 is tile_rows_height_minus1−brick_row_height_minus1[2][0]=4.

Since brick_height_minus1[3]=1, it is found that the number of basic block rows of the brick corresponding to each of BID=5 to 7 is brick_height_minus1[3]+1=2.

Since tile_rows_height_minus1=5, it is found that the number of basic block rows of the brick corresponding to each of BID=8 to 10 is tile_rows_height_minus1+1=6.

Hence, the number of basic block rows in slice 3 can be derived as the sum of the numbers of basic block rows of the bricks corresponding to BID=3 to 10, that is, (2+4+2+2+2+6+6+6)=30. j ranges from 0 to 28.

In slice 4, corresponding slice_address=11, and corresponding num_bricks_in_slice_minus1=2. Hence, slice 4 is formed by bricks (three bricks) corresponding to BID=11 to 13 (=slice_address+num_bricks_in_slice_minus1). The number of basic block rows in slice 4 is the sum of the numbers of basic block rows of the bricks corresponding to BID=11 to 13.

Since brick_height_minus1[7]=2, it is found that the number of basic block rows of the brick corresponding to each of BID=11 and 12 is brick_height_minus1[7]+1=3.

Since tile_rows_height_minus1=5, it is found that the number of basic block rows of the brick corresponding to BID=13 is tile_rows_height_minus1+1=6.

Hence, the number of basic block rows in slice 4 can be derived as the sum of the numbers of basic block rows of the bricks corresponding to BID=11 to 13, that is, (3+3+6)=12. j ranges from 0 to 10.

By this processing, the number of basic block rows in each slice is determined. In this embodiment, since the number of entry_point_offset_minus1 can be derived from another syntax, it is not necessary to encode num_entry_point_offset and include it in the header, unlike the conventional method. Hence, according to this embodiment, it is possible to decrease the data amount of the bitstream.

In step S310, the control unit 199 determines whether encoding of all basic blocks in the input image is completed. As the result of this determination, if encoding of all basic blocks in the input image is completed, the process advances to step S311. On the other hand, if a basic block that has not been encoded yet remains in the input image, the process returns to step S303 to perform the subsequent for the unencoded basic block.

In step S311, the in-loop filter unit 109 performs in-loop filter processing for the reproduced image generated in step S306, and outputs the image that has undergone the in-loop filter processing.

As described above, according to this embodiment, it is not necessary to encode information representing how many pieces of information representing the start positions of coded data of basic block rows included in a brick are encoded and include the information in a bitstream, and a bitstream capable of deriving the information can be generated.

Second Embodiment

In this embodiment, an image decoding apparatus for decoding a bitstream generated by the image encoding apparatus according to the first embodiment will be described. Note that conditions common to the first embodiment, such as the configuration of a bitstream, are the same as described in the first embodiment, and a description thereof will be omitted.

An example of the functional configuration of the image decoding apparatus according to this embodiment will be described with reference to the block diagram of FIG. 2. A separation decoding unit 202 acquires a bitstream generated by the image encoding apparatus according to the first embodiment. The bitstream acquisition method is not limited to a specific acquisition method. For example, a bitstream may be acquired directly or indirectly from the image encoding apparatus via a network such as a LAN or the Internet, or a bitstream stored inside or outside the image decoding apparatus may be acquired. The separation decoding unit 202 then separates coded data concerning information and coefficients concerning decoding processing from the acquired bitstream and sends these to a decoding unit 203. Also, the separation decoding unit 202 decodes the coded data of the header of the bitstream. In this embodiment, division information is generated by decoding header information concerning image division, such as the sizes of tiles, bricks, slices, and basic blocks, and the generated division information is output to an image reproduction unit 205. That is, the separation decoding unit 202 performs an operation reverse to that of the integration encoding unit 111 shown in FIG. 1.

The decoding unit 203 decodes the coded data output from the separation decoding unit 202, thereby reproducing quantization coefficients and prediction information. An inverse quantization/inverse transformation unit 204 inversely quantizes the quantization coefficients to generate transformation coefficients, and inversely orthogonally transforms the generated transformation coefficients to reproduce prediction errors.

A frame memory 206 is a memory configured to store the image data of a reproduced picture. The image reproduction unit 205 generates a predicted image by appropriately referring to the frame memory 206 based on the input prediction information. The image reproduction unit 205 then generates a reproduced image from the generated predicted image and the prediction errors reproduced by the inverse quantization/inverse transformation unit 204. For the reproduced image, the image reproduction unit 205 specifies the positions of tiles, bricks, and slices in the input image based on the division information input from the separation decoding unit 202, and outputs the positions.

An in-loop filter unit 207 performs in-loop filter processing such as deblocking filter processing for the reproduced image, and outputs the image that has undergone the in-loop filter processing, like the above-described in-loop filter unit 109. A control unit 299 controls the operation of the entire image decoding apparatus, and controls the operations of the above-described functional units of the image decoding apparatus.

Decoding processing of a bitstream by the image decoding apparatus having the configuration shown in FIG. 2 will be described next. A description will be made below assuming that a bitstream is input to the image decoding apparatus on a frame basis. However, a bitstream of a still image corresponding to one frame may be input to the image decoding apparatus. Also, in this embodiment, to facilitate the description, only intra-prediction decoding processing will be described. However, the embodiment is not limited to this, and can also be applied to inter-prediction decoding processing.

The separation decoding unit 202 separates coded data concerning information and coefficients concerning decoding processing from an input bitstream and sends these to the decoding unit 203. Also, the separation decoding unit 202 decodes the coded data of the header of the bitstream. More specifically, the separation decoding unit 202 decodes basic block data division information, tile data division information, brick data division information, slice data division information 0, basic block row data synchronization information, basic block row data position information, and the like in FIG. 6, thereby generating division information. The separation decoding unit 202 then outputs the generated division information to the image reproduction unit 205. Also, the separation decoding unit 202 reproduces the coded data of each basic block of picture data and outputs it to the decoding unit 203.

The decoding unit 203 decodes the coded data output from the separation decoding unit 202, thereby reproducing quantization coefficients and prediction information. The reproduced quantization coefficients are output to the inverse quantization/inverse transformation unit 204, and the reproduced prediction information is output to the image reproduction unit 205.

The inverse quantization/inverse transformation unit 204 inversely quantizes the input quantization coefficients to generate transformation coefficients, and inversely orthogonally transforms the generated transformation coefficients to reproduce prediction errors. The reproduced prediction errors are output to the image reproduction unit 205.

The image reproduction unit 205 generates a predicted image by appropriately referring to the frame memory 206 based on the prediction information input from the separation decoding unit 202. The image reproduction unit 205 then generates a reproduced image from the generated predicted image and the prediction errors reproduced by the inverse quantization/inverse transformation unit 204. For the reproduced image, the image reproduction unit 205 specifies the shapes of tiles, bricks, and slices as shown in, for example, FIG. 7 and their positions in the input image based on the division information input from the separation decoding unit 202, and outputs (stores) these to (in) the frame memory 206. The images stored in the frame memory 206 are used when referred to at the time of prediction.

The in-loop filter unit 207 performs in-loop filter processing such as deblocking filter processing for the reproduced image read out from the frame memory 206, and outputs (stores) the image that has undergone the in-loop filter processing to (in) the frame memory 206.

The control unit 299 outputs the reproduced image stored in the frame memory 206. The output destination of the reproduced image is not limited to a specific output destination. For example, the control unit 299 may output the reproduced image to a display device provided in the image decoding apparatus and cause the display device to display the reproduced image. Also, for example, the control unit 299 may transmit the reproduced image to an external apparatus via a network such as a LAN or the Internet.

Figure 4:
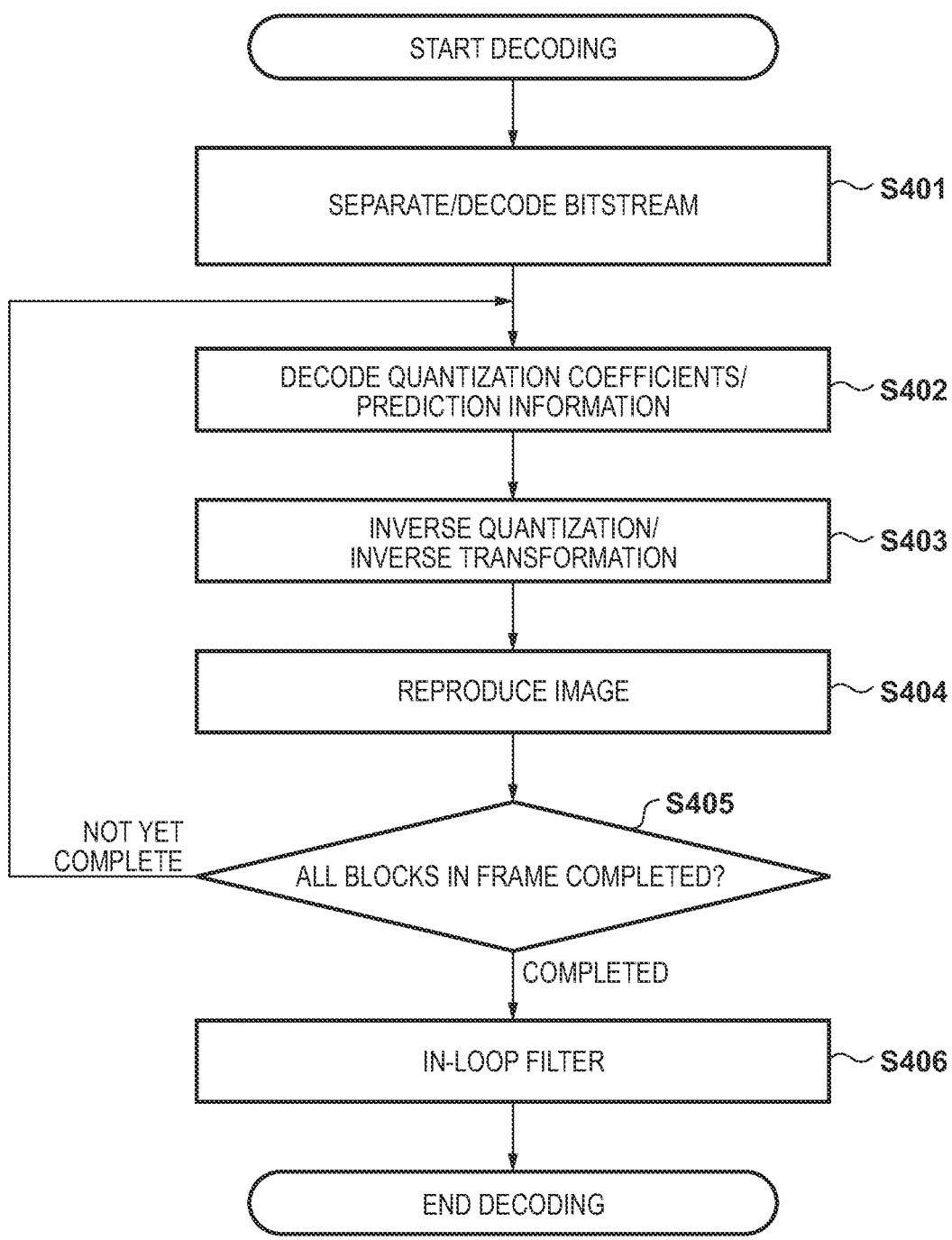
FIG. 4 is a flowchart of decoding processing of a bitstream by the image decoding apparatus.

Decoding processing of a bitstream (decoding processing of a bitstream having the configuration shown in FIG. 6) by the image decoding apparatus according to this embodiment will be described next with reference to the flowchart of FIG. 4.

In step S401, the separation decoding unit 202 separates coded data concerning information and coefficients concerning decoding processing from an input bitstream and sends these to the decoding unit 203. Also, the separation decoding unit 202 decodes the coded data of the header of the bitstream. More specifically, the separation decoding unit 202 decodes basic block data division information, tile data division information, brick data division information, slice data division information, basic block row data synchronization information, basic block row data position information, and the like in FIG. 6, thereby generating division information. Then, the separation decoding unit 202 outputs the generated division information to the image reproduction unit 205. In addition, the separation decoding unit 202 reproduces the coded data of each basic block of picture data and outputs it to the decoding unit 203.

In this embodiment, the division of the input image that is the encoding source of the bitstream is the division shown in FIGS. 8A and 8B. Information concerning the input image that is the encoding source of the bitstream. and its division can be derived from the division information.

From pic_width_in_luma_samples included in image size information, it is possible to specify that the size (horizontal size) of the input image in the horizontal direction is 1,152 pixels. Also, from pic_height_in_luma_samples included in image size information, it is possible to specify that the size (vertical size) of the input image in the vertical direction is 1,152 pixels.

Also, since log2_ctu_size_minus2=4 in the basic block data division information, the size of a basic block can be derived as 64×64 pixels from 1<<log2_ctu_size_minus2+2.

Since single_tile_in_pic_flag=0 in the tile data division information, it can be specified that the input image is divided into a plurality of tiles. Since uniform_tile_spacing_flag=1, it can be specified that the tiles (except those at the ends) have the same size.

In addition, since tile_cols_width_minus1=5, and tile_rows_height_minus1=5, it is possible to specify that each tile is formed by 6×6 basic blocks. That is, it is possible to specify that each tile is formed by 384×384 pixels. Since the input image has a size of 1152×1152 pixels, it is found that the input image is divided into three tiles in the horizontal direction and three tiles in the vertical direction, that is, a total of nine tiles and then encoded.

Also, since brick_splitting_present_flag=1 in the brick data division information, it is possible to specify that at least one tile in the input image is divided into a plurality of bricks.

In addition, brick_split_flag[1], brick_split_flag[4], brick_split_flag[5], brick_split_flag[6], and brick_split_flag[8] are 0. It is therefore possible to specify that the tiles corresponding to tile ID=1, 4, 5, 6, and 8 are not divided into bricks. In this embodiment, since the number of basic block rows is 6 in all tiles, it is found that the number of basic block rows of each of the bricks of the tiles corresponding to tile ID=1, 4, 5, 6, and 8 is 6.

On the other hand, brick_split_flag[0], brick_split_flag[2], brick_split_flag[3], and brick_split_flag[7] are 1. It is therefore possible to specify that the tiles corresponding to tile ID=0, 2, 3, and 7 are divided into bricks. In addition, uniform_brick_spacing_flag[0], uniform_brick_spacing_flag[3], and uniform_brick_spacing_flag[7] are all 1. It is therefore possible to specify that each of the tiles corresponding to tile ID=0, 3, and 7 is divided into bricks of the same size.

In addition, both brick_height_minus1[0] and brick_height_minus1[7] are 2. Hence, it is possible to specify that in both the tile corresponding to tile ID=0 and the tile corresponding to tile ID=7, the number of vertical basic blocks of each brick in the tile is 3. It is also possible to specify that in both the tile corresponding to tile ID=0 and the tile corresponding to tile ID=7, the number of bricks in the tile is 2 (=the number of basic block rows in the tile (6)/the number of vertical basic blocks of each brick in the tile (3)".

In addition, brick_height_minus1[3] is 1. It is therefore possible to specify that the number of vertical basic blocks of each brick in the tile corresponding to tile ID=3 is 2. It is also possible to specify that the number of bricks in the tile corresponding to tile ID=3 is 3 (=the number of basic block rows in the tile (6)/the number of vertical basic blocks of each brick in the tile (2)".

As for the tile corresponding to tile ID=2, since brick_rows_minus1[2]=1, it is possible to specify that the tile is formed by two bricks. Also, uniform_brick_spacing_flag[2]=0. Hence, it can be specified that a brick whose size is different from the other exists in the tile corresponding to tile ID=2, brick_row_height_minus1[2][0]=1, brick_row_height_minus1[2][1]=3, and the number of vertical basic blocks is 6 in all tiles. It is therefore possible to specify that the tile corresponding to tile ID=2 is formed, sequentially from the upper side, by a brick in which the number of vertical basic blocks is 2 and a brick in which the number of vertical basic blocks is 4. Note that brick_row_height_minus1[2][1]=3 may not be encoded. This is because if the number of bricks in a tile is 2, the height of the second brick can be obtained from the height of the tile and the height of the first brick in the tile (brick_row_height_minus1[2][0]=1).

In addition, since single_brick_per_slice_flag=0 in slice data division information 0, it can be specified that at least one slice is formed by a plurality of bricks. In this embodiment, if uniform_brick_spacing_flag[i]=0, num_brick_rows_minus1[i] representing (the number of bricks that form the ith tile−1) is included in the brick data division information. However, the present invention is not limited to this.

For example, assume that the number of bricks that form the ith tile is 2 or more when brick_split_flag[i]=1. Then, num_brick_rows_minus2[i] representing (the number of bricks that form the tile−2) may be decoded in place of num_brick_rows_minus1[i]. This can decode the bitstream in which the number of bits of a syntax representing the number of bricks that form the tile is decreased.

Next, the coordinates of the upper left and the lower right boundaries of each brick are obtained. The coordinates are represented by the horizontal position and the vertical position of a basic block while setting the upper left corner of the input image to the origin. For example, the coordinates of the upper left boundary of the basic block that is third from the left and second from the top are (3, 2), and the coordinates of the lower right boundary are (4, 3).

The coordinates of the upper left boundary of the brick of BID=0 in the tile corresponding to tile ID=0 are (0, 0). Since the number of basic block rows of the brick of BID=0 is 3, and the number of horizontal basic blocks is 6 in all tiles, the coordinates of the lower right boundary are (3, 3).

The coordinates of the upper left boundary of the brick of BID=1 in the tile corresponding to tile ID=0 are (0, 3). Since the number of basic block rows of the brick of BID=1 is 3, and the number of horizontal basic blocks is 6 in all tiles, the coordinates of the lower right boundary are (6, 6).

The coordinates of the upper left boundary of the tile corresponding to tile ID=1 (the brick of BID=2) are (6, 0). Since the number of basic block rows of the brick of BID=2 is 6, and the number of horizontal basic blocks is 6 in all tiles, the coordinates of the lower right boundary are (12, 6).

The coordinates of the upper left boundary of the brick of BID=3 in the tile corresponding to tile ID=2 are (12, 0). Since the number of basic block rows of the brick of BID=3 is 2, the coordinates of the lower right boundary are (18, 2).

The coordinates of the upper left boundary of the brick of BID=4 in the tile corresponding to tile ID=2 are (12, 2). Since the number of basic block rows of the brick of BID=4 is 4, the coordinates of the lower right boundary are (18, 6).

The coordinates of the upper left boundary of the brick of BID=5 in the tile corresponding to tile ID=3 are (0, 6). Since the number of basic block rows of the brick of BID=5 is 2, the coordinates of the lower right boundary are (6, 8).

The coordinates of the upper left boundary of the brick of BID=6 in the tile corresponding to tile ID=3 are (0, 8). Since the number of basic block rows of the brick of BID=6 is 2, the coordinates of the lower right boundary are (6, 10).

The coordinates of the upper left boundary of the brick of BID=7 in the tile corresponding to tile ID=3 are (0, 10). Since the number of basic block rows of the brick of BID=7 is 2, the coordinates of the lower right boundary are (6, 12).

The coordinates of the upper left boundary of the tile corresponding to tile ID=4 (the brick of BID=8) are (6, 6). Since the number of basic block rows of the brick of BID=8 is 6, and the number of horizontal basic blocks is 6 in all tiles, the coordinates of the lower right boundary are (12, 12).

The coordinates of the upper left boundary of the tile corresponding to tile ID=5 (the brick of BID=9) are (12, 6). Since the number of basic block rows of the brick of BID=9 is 6, and the number of horizontal basic blocks is 6 in all tiles, the coordinates of the lower right boundary are (18, 12).

The coordinates of the upper left boundary of the tile corresponding to tile ID=6 (the brick of BID=10) are (0, 12). Since the number of basic block rows of the brick of BID=10 is 6, and the number of horizontal basic blocks is 6 in all tiles, the coordinates of the lower right boundary are (6, 18).

The coordinates of the upper left boundary of the brick of BID=11 in the tile corresponding to tile ID=7 are (6, 12). Since the number of basic block rows of the brick of BID=11 is 3, and the number of horizontal basic blocks is 6 in all tiles, the coordinates of the lower right boundary are (12, 15).

The coordinates of the upper left boundary of the brick of BID=12 in the tile corresponding to tile ID=7 are (6, 15). Since the number of basic block rows of the brick of BID=12 is 3, and the number of horizontal basic blocks is 6 in all tiles, the coordinates of the lower right boundary are (12, 18).

The coordinates of the upper left boundary of the tile corresponding to tile ID=8 (the brick of BID=13) are (12, 12). Since the number of basic block rows of the brick of BID=13 is 6, and the number of horizontal basic blocks is 6 in all tiles, the coordinates of the lower right boundary are (18, 18).

Next, bricks included in each slice are specified. For slice 0, slice_address is 0, and num_bricks_in_slice_minus1 is 0. It is therefore found that slice 0 is formed by only the brick of BID=0.

For slice 1, slice_address is 1, and num_bricks_in_slice_minus1 is 0. It is therefore found that slice 1 is formed by only the brick of BID=1.

For slice 2, slice_address is 2, and num_bricks_in_slice_minus1 is 0. It is therefore found that slice 2 is formed by only the brick of BID=2.

For slice 3, slice_address is 3, and num_bricks_in_slice_minus1 is 7. It is therefore found that slice 3 is formed by the bricks of BID=3 to 10 (=slice_address+num_bricks_in_slice_minus1).

For slice 4, slice_address is 11, and num_bricks_in_slice_minus1 is 2. It is therefore found that slice 4 is formed by the bricks of BID=11 to 13 (=slice_address+num_bricks_in_slice_minus1).

In addition, entropy_coding_sync_enabled_flag is 1. Hence, it is found that (the size of the coded data of the (j−1)th basic block row in the slice−1) is encoded as entry_point_offset_minus1[j−1]. The number is (the number of basic block rows of the slice to be processed−1).

For slice 0, since the number of basic block rows of the block of BID=0, which forms slice 0, is 3, 3−1=2, and j ranges from 0 to 1. For slice 1, since the number of basic block rows of the block of BID=1. which forms slice 1, is 3, 3−1=2, and j ranges from 0 to 1. For slice 2, since the number of basic block rows of the block of BID=2, which forms slice 2, is 6, 6−1=5, and j ranges from 0 to 4. For slice 3, since the sum of the numbers of basic block rows of the bricks of BID=3 to 10, which form slice 3, is 2+4+2+2+2+6+6+6=30, j ranges from 0 to 28.

For slice 4, since the sum of the numbers of basic block rows of the bricks of BID=11 to 13, which form slice 4, is 3+3+6=12, j ranges from 0 to 10.

As described above, even if num_entry_point_offset is not encoded as in the conventional method, the number of entry_point_offset_minus1 can be derived from another syntax. Since the start position of the data of each basic block row can be known, decoding processing can be performed in parallel on a basic block row basis. The division information derived by the separation decoding unit 202 is sent to the image reproduction unit 205 and used to specify the position of the processing target in the input image in step S404.

In step S402, the decoding unit 203 decodes the coded data separated by the separation decoding unit 202, thereby reproducing quantization coefficients and prediction information. In step S403, the inverse quantization/inverse transformation unit 204 inversely quantizes the input quantization coefficients to generate transformation coefficients, and inversely orthogonally transforms the generated transformation coefficients to reproduce prediction errors.

In step S404, the image reproduction unit 205 generates a predicted image by appropriately referring to the frame memory 206 based on the prediction information input from the decoding unit 203. The image reproduction unit 205 then generates a reproduced image from the generated predicted image and the prediction errors reproduced by the inverse quantization/inverse transformation unit 204. For the reproduced. image, the image reproduction unit 205 specifies the positions of tiles, bricks, and slices in the input image based on the division information input from the separation decoding unit 202, composites these to the positions, and outputs (stores) these to (in) the frame memory 206.

In step S405, the control unit 299 determines whether all basic blocks of the input image are decoded. As the result of this determination, if all basic blocks of the input image are decoded, the process advances to step S406. On the other hand, if an undecoded basic block remains in the input image, the process returns to step S402 to perform decoding processing for the undecoded basic block.

In step S406, the in-loop filter unit 207 performs in-loop filter processing for the reproduced image read out from the frame mentor) 206, and outputs (stores) the image that has undergone the in-loop filter processing to (in) the frame memory 206.

As described above, according to this embodiment, it is possible to decode the input image from "the bitstream that does not include information representing how many pieces of information representing the start positions of coded data of basic block rows included in a brick are encoded", which is generated by the image encoding apparatus according to the first embodiment.

Note that the image encoding apparatus according to the first embodiment and the image decoding apparatus according to the second embodiment may be separate apparatuses. The image encoding apparatus according to the first embodiment and the image decoding apparatus according to the second embodiment may be integrated into one apparatus.

Third Embodiment

Figure 2:
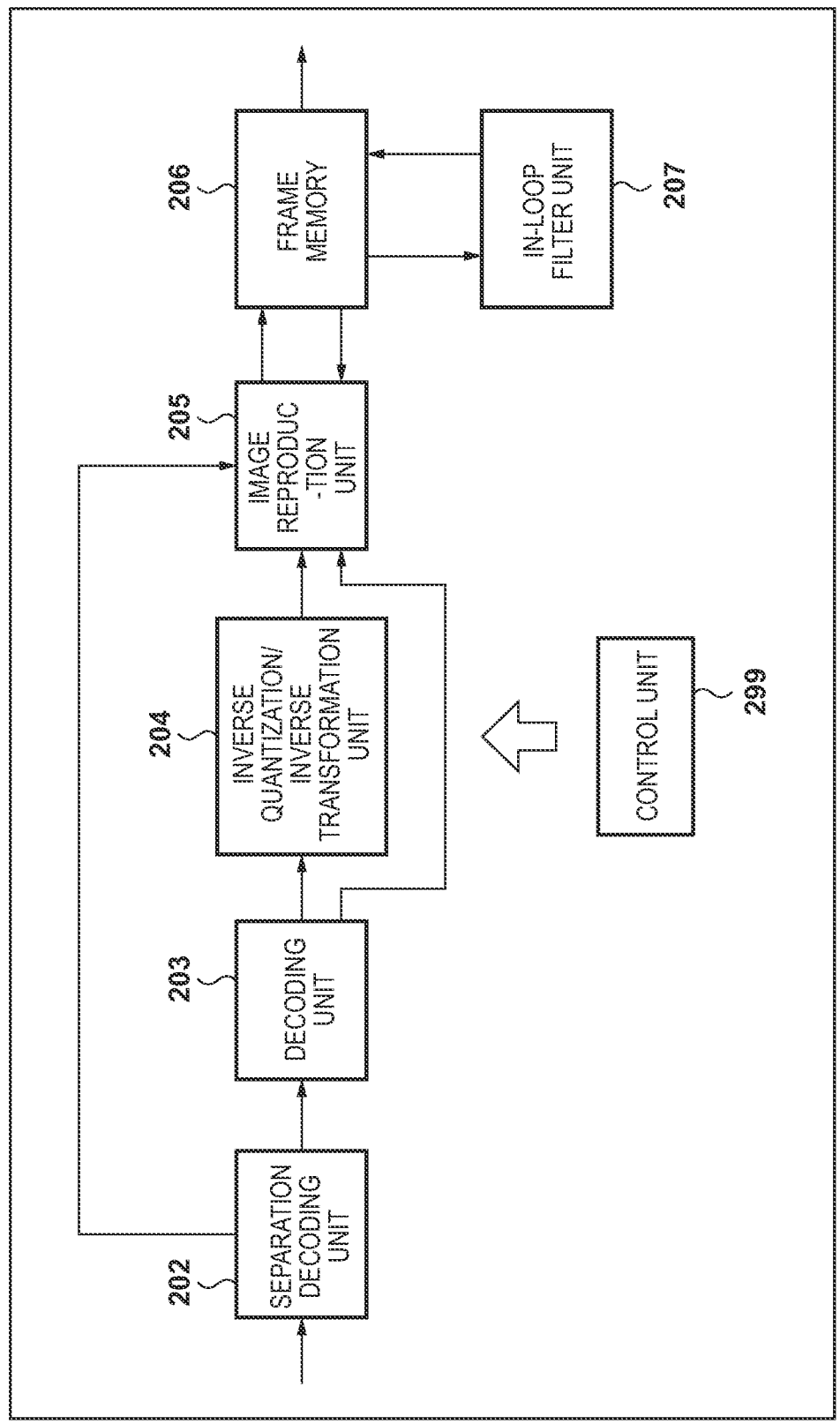
FIG. 2 is a block diagram showing an example of the functional configuration of an image decoding apparatus.

The functional units shown in FIG. 1 or 2 may be implemented by hardware, and some of these may be implemented by software. In the latter case, the functional units other than the frame memory 108 and the frame memory 206 may be implemented by software (computer program). A computer apparatus capable of executing such a computer program can be applied to the above-described image encoding apparatus or image decoding apparatus.

Figure 5:
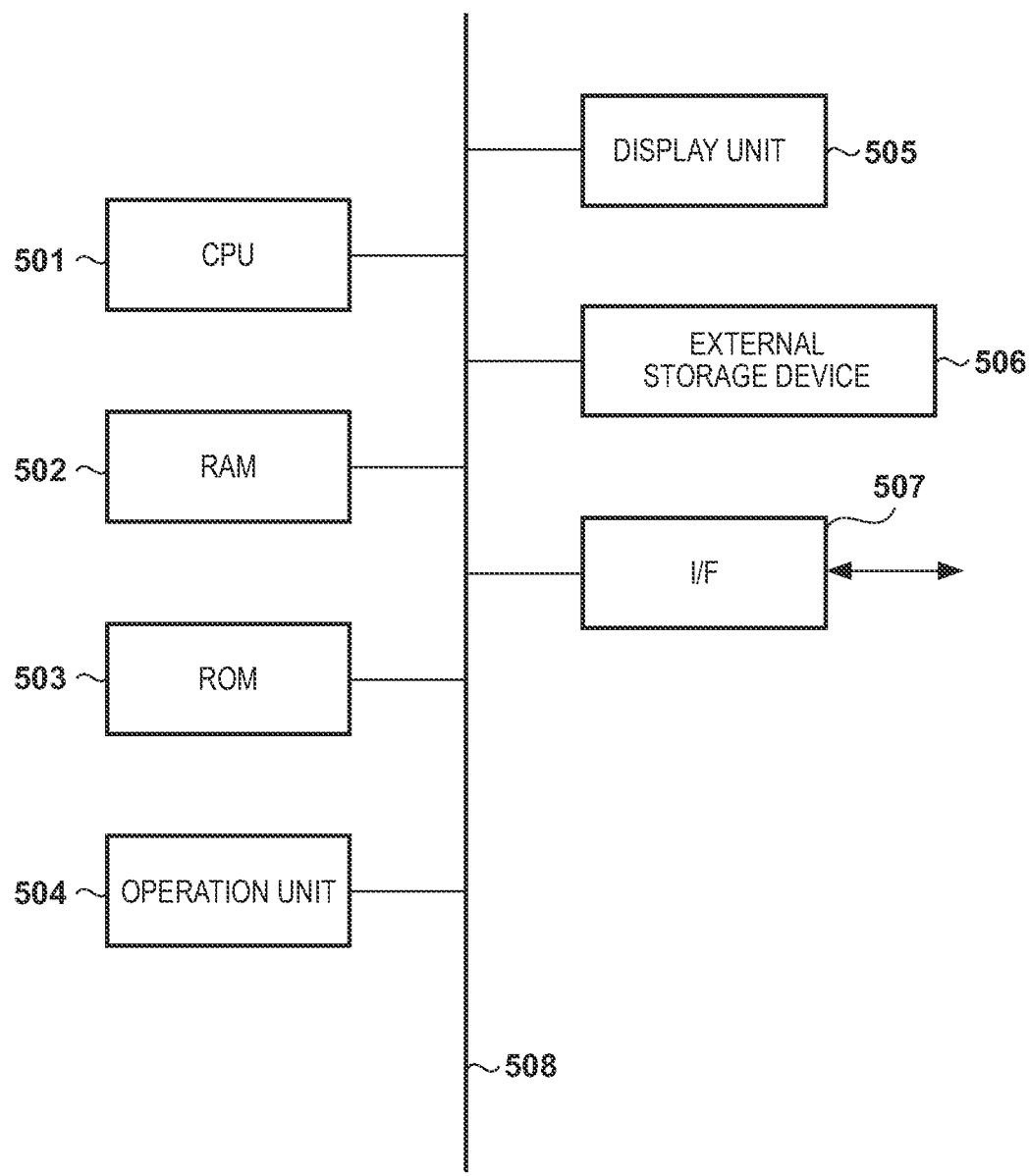
FIG. 5 is a block diagram showing an example of the hardware configuration of a computer apparatus.

An example of the hardware configuration of the computer apparatus applicable to the above-described image encoding apparatus or image decoding apparatus will be described with reference to the block diagram of FIG. 5. Note that the hardware configuration shown in FIG. 5 is merely an example of the hardware configuration of the computer apparatus applicable to the above-described image encoding apparatus or image decoding apparatus, and changes and modification can appropriately be made.

A CPU 501 executes various kinds of processing using computer programs and data stored in a RAM 502 or a ROM 503. Accordingly, the CPU 501 controls the operation of the entire computer apparatus, and also executes or controls each process described as processing to be performed by the above-described image encoding apparatus or image decoding apparatus. That is, the CPU 501 can function as the functional units (other than the frame memory 108 and the frame memory 206) shown in FIG. 1 or 2.

The RAM 502 includes an area configured to store computer programs and data loaded from the ROM 503 or an external storage device 506 and an area configured to store data received from the outside via an I/F 507. Also, the RAM 502 includes a work area used by the CPU 501 to execute various kinds of processing. The RAM 502 can thus appropriately provide various kinds of areas. The setting data, the activation program, and the like of the computer apparatus are stored in the ROM 503.

An operation unit 504 is a user interface such as a keyboard, a mouse, or a touch panel screen. When a user operates the operation unit 504, various kinds of instructions can be input to the CPU 501.

A display unit 505 is formed by a liquid crystal screen, a touch panel screen, or the like and can display the processing result of the CPU 501 by an image, characters, or the like. Note that the display unit 505 may be a device such as a projector that projects an image or characters.

The external storage device 506 is a mass information storage device such as a hard disk drive. The external storage device 506 stores an OS (Operating System) and computer programs and data used to cause the CPU 501 to execute or control each process described above as processing to be performed by the above-described image encoding apparatus or image decoding apparatus.

The computer programs stored in the external storage device 506 include a computer program configured to cause the CPU 501 to execute or control the functions of the functional units other than the frame memory 108 and the frame memory 206 in FIG. 1 or 2. In addition, the data stored in the external storage device 506 include information described as known information in the above description and various kinds of information associated with encoding and decoding.

The computer programs and data stored in the external storage device 506 are appropriately loaded into the RAM 502 under the control of the CPU 501 and processed by the CPU 501.

The frame memory 108 provided in the image encoding apparatus shown in FIG. 1 or the frame memory 206 provided in the image decoding apparatus shown in FIG. 2 can be implemented using a memory device such as the above-described RAM 502 or external storage device 506.

The I/F 507 is an interface configured to perform data communication with an external apparatus. For example, if the computer apparatus is applied to the image encoding apparatus, the image encoding apparatus can output a generated bitstream to the outside via the 507. In addition, if the computer apparatus is applied to the image decoding apparatus, the image decoding apparatus can receive a bitstream via the I/F 507. Also, the image decoding apparatus can transmit the result of decoding the bitstream to the outside via the I/F 507. All the CPU 501, the RAM 502, the ROM 503, the operation unit 504, the display unit 505, the external storage device 506, and the I/F 507 are connected to a bus 508.

Note that the detailed numerical values used in the above description are merely used to make a detailed description and are not intended to limit the above-described embodiments to these numerical values. Some or all of the above-described embodiments may appropriately be combined. Some or all of the above-described embodiments may selectively be used.

According to the configuration of the present invention, it is possible to decrease the code amount of a bitstream by decreasing redundant syntaxes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image encoding apparatus comprising:
a division unit configured to divide an image into a rectangular region including at least one block row formed from a plurality of blocks;
an encoding unit configured to:
encode, into a bitstream, an entropy coding sync enabled flag related to enablement of parallel processing, wherein when a value of the entropy coding sync enabled flag is 1, the parallel processing is enabled;
encode, into a picture parameter set of the bitstream, a rect slice flag which indicates, when a value of the rect slice flag is 1, that a first mode in which a slice is rectangular is used, and indicates, when the value of the rect slice flag is 0, that a second mode in which a slice is capable of having a shape which is not rectangular is used;
encode, into the picture parameter set of the bitstream, first information corresponding to the number of blocks, in a vertical direction, of the rectangular region in the image;
encode, into a slice header of the bitstream, second information of the number of rectangular regions included in a slice in the image; and
encode, into the slice header of the bitstream, an address of the slice in a case where the image includes a plurality of rectangular regions and the value of the rect slice flag is 0; and
an identifying unit configured to identify, for the slice, the number of syntax elements each of which is used to identify a start position of coded data of a block row, by using at least (a) the address of the slice, (b) the first information corresponding to the number of blocks, in the vertical direction, of the rectangular region in the image, and (c) the second information of the number of the rectangular regions included in the slice in the image, in a case where the value of the entropy coding sync enabled flag is 1 and the value of the rect slice flag is 0,
wherein third information used for determining a size of each of blocks forming the block row is encoded into a sequence parameter set in the bitstream, and the syntax elements, the number of which is the number identified by the identifying unit, are included in the slice header in the bitstream.

2. The image encoding apparatus according to claim 1, wherein the encoding unit encodes the block rows in the rectangular region in parallel.

3. The image encoding apparatus according to claim 1, wherein the image is one of a still image and an image of each frame in a moving image.

4. The image encoding apparatus according to claim 1, wherein the parallel processing is the Wavefront Parallel Processing (WPP).

5. An image decoding apparatus configured to decode an image from a bitstream obtained by encoding an image including a rectangular region including at least one block row formed from a plurality of blocks, comprising:
a decoding unit configured to:
decode, from the bitstream, an entropy coding sync enabled flag related to enablement of parallel processing, wherein when a value of the entropy coding sync enabled flag is 1, the parallel processing is enabled;
decode, from a picture parameter set of the bitstream, a rect slice flag which indicates, when a value of the rect slice flag is 1, that a first mode in which a slice is rectangular is used, and indicates, when the value of the rect slice flag is 0, that a second mode in which a slice is capable of having a shape which is not rectangular is used;
decode, from the picture parameter set of the bitstream, first information corresponding to the number of blocks, in a vertical direction, of a rectangular region in the image;
decode, from a slice header of the bitstream, second information of the number of rectangular regions included in a slice in the image; and
decode, from the slice header of the bitstream, an address of the slice in a case where the image includes a plurality of rectangular regions and the value of the rect slice flag is 0; and
an identifying unit configured to identify, for the slice, the number of syntax elements each of which is used to identify a start position of coded data of a block row, by using at least (a) the address of the slice, (b) the first information corresponding to the number of blocks, in the vertical direction, of the rectangular region in the image, and (c) the second information of the number of the rectangular regions included in the slice in the image, in a case where the value of the first entropy coding sync enabled flag is 1 and the value of the second rect slice flag is 0,
wherein a size of each of blocks forming the block row is determined from third information decoded from a sequence parameter set in the bitstream, and the syntax elements, the number of which is the number identified by the identifying unit, are included in the slice header in the bitstream.

6. The image decoding apparatus according to claim 5, wherein the parallel processing of is the Wavefront Parallel Processing (WPP).

7. The image decoding apparatus according to claim 5, wherein each of the blocks forming the block row corresponds to a CTU (Coding Tree Unit).

8. The image decoding apparatus according to claim 5, wherein the size of each of the blocks forming the block row is determined by performing arithmetic left shift of 1 by a sum of a value of the third information and a predetermined integer.

9. The image decoding apparatus according to claim 5, wherein the decoding unit decodes the block rows in the rectangular region in parallel.

10. The image decoding apparatus according to claim 5, wherein the image is one of a still image and an image of each frame in a moving image.

11. An image encoding method, comprising:
dividing an image into a rectangular region including at least one block row formed from a plurality of blocks;
encoding, into a bitstream, an entropy coding sync enabled flag related to enablement of parallel processing, wherein when a value of the entropy coding sync enabled flag is 1, the parallel processing is enabled;
encoding, into a picture parameter set of the bitstream, a second rect slice flag which indicates, when a value of the rect slice flag is 1, that a first mode in which a slice is rectangular is used, and indicates, when the value of the rect slice flag is 0, that a second mode in which a slice is capable of having a shape which is not rectangular is used;
encoding, into the picture parameter set of the bitstream, first information corresponding to the number of blocks, in a vertical direction, of the rectangular region in the image;
encoding, into a slice header of the bitstream, second information of the number of rectangular regions included in a slice in the image;
encoding, into the slice header of the bitstream, an address of the slice in a case where the image includes a plurality of rectangular regions and the value of the rect slice flag is 0; and
identifying, for the slice, the number of syntax elements each of which is used to identify a start position of coded data of a block row, by using at least (a) the address of the slice, (b) the first information corresponding to the number of blocks, in the vertical direction, of the rectangular region in the image, and (c) the second information of the number of the rectangular regions included in the slice in the image, in a case where the value of the entropy coding sync enabled flag is 1 and the value of the rect slice flag is 0,
wherein third information used for determining a size of each of blocks forming the block row is encoded into a sequence parameter set in the bitstream, and the syntax elements, the number of which is the identified number, are included in the slice header in the bitstream.

12. An image decoding method for decoding an image from a bitstream obtained by encoding an image including a rectangular region including at least one block row formed from a plurality of blocks, comprising:
decoding, from the bitstream, an entropy coding sync enabled flag related to enablement of parallel processing, wherein when a value of the entropy coding sync enabled flag is 1, the parallel processing is enabled;
decoding, from a picture parameter set of the bitstream, a second rect slice flag which indicates, when a value of the rect slice flag is 1, that a first mode in which a slice is rectangular is used, and indicates, when the value of the rect slice flag is 0, that a second mode in which a slice is capable of having a shape which is not rectangular is used;
decoding, from the picture parameter set of the bitstream, first information corresponding to the number of blocks, in a vertical direction, of a rectangular region in the image;
decoding, from a slice header of the bitstream, second information of the number of rectangular regions included in a slice in the image;
decoding, from the slice header of the bitstream, an address of the slice in a case where the image includes a plurality of rectangular regions and the value of the rect slice flag is 0;
identifying, for the slice, the number of syntax elements each of which is used to identify a start position of coded data of a block row, by using at least (a) the address of the slice, (b) the first information corresponding to the number of blocks, in a vertical direction, of the rectangular region in the image, and (c) the second information of the number of the rectangular regions included in the slice in the image, in a case where the value of the entropy coding sync enabled flag is 1 and the value of the second rect slice flag is 0,
wherein a size of each of blocks forming the block row is determined from third information decoded from a sequence parameter set in the bitstream, and the syntax elements, the number of which is the identified number, are included in the slice header in the bitstream.

13. A non-transitory computer-readable storage medium for storing a computer program configured to cause a computer to execute:
dividing an image into a rectangular region including at least one block row formed from a plurality of blocks;
encoding, into a bitstream, an entropy coding sync enabled flag related to enablement of parallel processing, wherein when a value of the entropy coding sync enabled flag is 1, the parallel processing is enabled;
encoding, into a picture parameter set of the bitstream, a rect slice flag which indicates, when a value of the rect slice flag is 1, that a first mode in which a slice is rectangular is used, and indicates, when the value of the rect slice flag is 0, that a second mode in which a slice is capable of having a shape which is not rectangular is used;
encoding, into the picture parameter set of the bitstream, first information corresponding to the number of blocks, in a vertical direction, of the rectangular region in the image;
encoding, into a slice header of the bitstream, second information of the number of rectangular regions included in a slice in the image;
encoding, into the slice header of the bitstream, an address of the slice in a case where the image includes a plurality of rectangular regions and the value of the rect slice flag is 0; and
identifying, for the slice, the number of syntax elements each of which is used to identify a start position of coded data of a block row, by using at least (a) the address of the slice, (b) the first information corresponding to the number of blocks, in the vertical direction, of the rectangular region in the image, and (c) the second information of the number of the rectangular regions included in the slice in the image, in a case where the value of the entropy coding sync enabled flag is 1 and the value of the rect slice flag is 0, wherein third information used for determining a size of each of blocks forming the block row is encoded into a sequence parameter set in the bitstream, and the syntax elements, the number of which is the identified number, are included in the slice header in the bitstream.

14. A non-transitory computer-readable storage medium for storing a computer program configured to cause a computer to execute an image decoding method for decoding an image from a bitstream obtained by encoding an image including a rectangular region including at least one block row formed from a plurality of blocks, comprising:

decoding, from the bitstream, an entropy coding sync enabled flag related to enablement of parallel processing, wherein when a value of the entropy coding sync enabled flag is 1, the parallel processing is enabled;

decoding, from a picture parameter set of the bitstream, a second rect slice flag which indicates, when a value of the rect slice flag is 1, that a first mode in which a slice is rectangular is used, and indicates, when the value of the rect slice flag is 0, that a second mode in which a slice is capable of having a shape which is not rectangular is used;

decoding, from the picture parameter set of the bitstream, first information corresponding to the number of blocks, in a vertical direction, of a rectangular region in the image;

decoding, from a slice header of the bitstream, second information of the number of rectangular regions included in a slice in the image;

decoding, from the slice header of the bitstream, an address of the slice in a case where the image includes a plurality of rectangular regions and the value of the rect slice flag is 0;

identifying, for the slice, the number of syntax elements each of which is used to identify a start position of coded data of a block row, by using at least (a) the address of the slice, (b) the first information corresponding to the number of blocks, in a vertical direction, of the rectangular region in the image, and (c) the second information of the number of the rectangular regions included in the slice in the image, in a case where the value of the entropy coding sync enabled flag is 1 and the value of the rect slice flag is 0, wherein a size of each of blocks forming the block row is determined from third information decoded from a sequence parameter set in the bitstream, and the syntax elements, the number of which is the identified number, are included in the slice header in the bitstream.

* * * * *